(12) United States Patent
Grunwald et al.

(10) Patent No.: US 11,152,602 B2
(45) Date of Patent: Oct. 19, 2021

(54) USING FORMATION PARAMETERS TO EXTEND THE CYCLING LIFETIME OF LITHIUM ION BATTERIES

(71) Applicant: StoreDot Ltd., Herzeliya (IL)

(72) Inventors: Assaf Grunwald, Tel-Aviv (IL); Leonid Krasovitsky, Rishon LeTzion (IL); Dmitry Voyevodin, Ramat Gan (IL)

(73) Assignee: StoreDot Ltd., Herzeliya (IL)

( * ) Notice: Subject to any disclaimer, the term of this patent is extended or adjusted under 35 U.S.C. 154(b) by 0 days.

(21) Appl. No.: 16/689,261

(22) Filed: Nov. 20, 2019

(65) Prior Publication Data

US 2020/0152960 A1    May 14, 2020

Related U.S. Application Data

(63) Continuation-in-part of application No. 16/180,066, filed on Nov. 5, 2018, now Pat. No. 10,833,521, which is a continuation-in-part of application No. 15/867,764, filed on Jan. 11, 2018, now Pat. No. 10,122,042.

(60) Provisional application No. 62/445,299, filed on Jan. 12, 2017, provisional application No. 62/769,582, filed on Nov. 20, 2018.

(51) Int. Cl.
| | | |
|---|---|---|
| *H02J 7/00* | (2006.01) | |
| *H01M 4/04* | (2006.01) | |
| *H01M 10/0525* | (2010.01) | |
| *H01M 4/38* | (2006.01) | |
| *H01M 10/44* | (2006.01) | |
| *H01M 10/48* | (2006.01) | |
| *H01M 4/02* | (2006.01) | |

(52) U.S. Cl.
CPC ......... *H01M 4/0447* (2013.01); *H01M 4/386* (2013.01); *H01M 4/387* (2013.01); *H01M 10/0525* (2013.01); *H01M 10/446* (2013.01); *H01M 10/48* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 5,393,617 A | 2/1995 | Klein | |
| 8,531,158 B2 * | 9/2013 | Wang | H01M 10/48 320/132 |
| 9,406,927 B1 | 8/2016 | Burshtain et al. | |
| 10,122,042 B2 | 11/2018 | Krasovitsky et al. | |
| 10,199,677 B2 | 2/2019 | Drach et al. | |
| 2002/0014879 A1 * | 2/2002 | Koike | H02J 7/0069 320/133 |
| 2003/0193318 A1 * | 10/2003 | Ozawa | H02J 7/0047 320/132 |
| 2005/0263331 A1 * | 12/2005 | Sopko | B60W 20/10 180/65.1 |
| 2006/0033469 A1 * | 2/2006 | Beaty | B60W 10/08 320/104 |
| 2007/0126404 A1 * | 6/2007 | Iida | B60L 3/0046 320/136 |
| 2007/0145949 A1 * | 6/2007 | Matsushima | H02J 7/00 320/132 |
| 2008/0091363 A1 * | 4/2008 | Lim | H02J 7/0029 702/63 |
| 2009/0035664 A1 | 2/2009 | Chiang et al. | |
| 2009/0117466 A1 | 5/2009 | Zhamu et al. | |
| 2009/0123813 A1 * | 5/2009 | Chiang | H01M 4/364 429/50 |
| 2009/0128097 A1 * | 5/2009 | Esnard | G01R 31/392 320/137 |
| 2009/0153100 A1 | 6/2009 | Okumura et al. | |
| 2009/0160403 A1 * | 6/2009 | Takeno | G01R 31/392 320/134 |
| 2009/0291368 A1 | 11/2009 | Newman et al. | |
| 2010/0052616 A1 * | 3/2010 | Takada | H01M 10/4207 320/130 |

(Continued)

FOREIGN PATENT DOCUMENTS

WO    WO 2018/109774    6/2018

OTHER PUBLICATIONS

Ning et al. "Cycle Life Modeling of Lithium-Ion Batteries", Journal of the Electrochemical Society, Jan. 1, 2004, vol. 151, No. 10, pp. A1584-A1591.
Office Action for U.S. Appl. No. 15/867,764, dated May 10, 2018.
Office Action for U.S. Appl. No. 16/012,781, dated Sep. 19, 2019.
Office Action for U.S. Appl. No. 16/180,066, dated Dec. 9, 2019.

*Primary Examiner* — Arun C Williams
(74) *Attorney, Agent, or Firm* — Reches Patents

(57) ABSTRACT

Methods and systems are provided for estimating and extending the expected cell cycling lifetime for produced lithium ion cells. Methods comprise monitoring charging and/or discharging peak(s) during formation cycles of the cells, which are defined with respect to dQ/dV measurements during the formation cycles, and ending the formation process once the charging and/or discharging peaks disappear, optionally deriving the expected cell cycling lifetime by comparing the monitored peaks to specified thresholds that are correlated to the lifetime. The methods may be implemented by controller(s) at the battery, device and/or factory levels, which may be operated in combination. Formation processes and/or cell operation schemes may be adjusted accordingly, to avoid excessive dQ/dV rates and increase thereby the cell cycling lifetime.

25 Claims, 17 Drawing Sheets

(12 of 17 Drawing Sheet(s) Filed in Color)

(56) References Cited

U.S. PATENT DOCUMENTS

| | | | |
|---|---|---|---|
| 2010/0261048 A1* | 10/2010 | Kim | B60L 58/12 |
| | | | 429/150 |
| 2010/0264929 A1 | 10/2010 | Ugaji et al. | |
| 2011/0236751 A1* | 9/2011 | Amiruddin | H01M 4/505 |
| | | | 429/188 |
| 2012/0169288 A1* | 7/2012 | Ueki | H01M 10/448 |
| | | | 320/134 |
| 2012/0176095 A1* | 7/2012 | Okuda | H02J 7/0013 |
| | | | 320/134 |
| 2012/0200266 A1* | 8/2012 | Berkowitz | H02J 7/0021 |
| | | | 320/139 |
| 2013/0110431 A1* | 5/2013 | Takada | H01M 10/48 |
| | | | 702/63 |
| 2013/0202945 A1 | 8/2013 | Zhamu et al. | |
| 2013/0307485 A1 | 11/2013 | He et al. | |
| 2013/0319870 A1 | 12/2013 | Chen et al. | |
| 2014/0272534 A1* | 9/2014 | Ueki | H01M 2/1686 |
| | | | 429/144 |
| 2016/0344068 A1* | 11/2016 | Kim | H02J 7/0021 |
| 2017/0294687 A1 | 10/2017 | Burshtain et al. | |
| 2018/0115024 A1* | 4/2018 | Sugeno | H02J 7/00 |
| 2018/0123129 A1* | 5/2018 | Takaoka | H01M 4/483 |
| 2018/0123185 A1* | 5/2018 | Kim | G01R 31/392 |
| 2018/0301749 A1 | 10/2018 | Krasovitsky et al. | |
| 2019/0074704 A1 | 3/2019 | Krasovitsky et al. | |
| 2019/0089015 A1 | 3/2019 | Paz et al. | |
| 2019/0148774 A1 | 5/2019 | Kuks et al. | |
| 2019/0198912 A1 | 6/2019 | Sella et al. | |

* cited by examiner

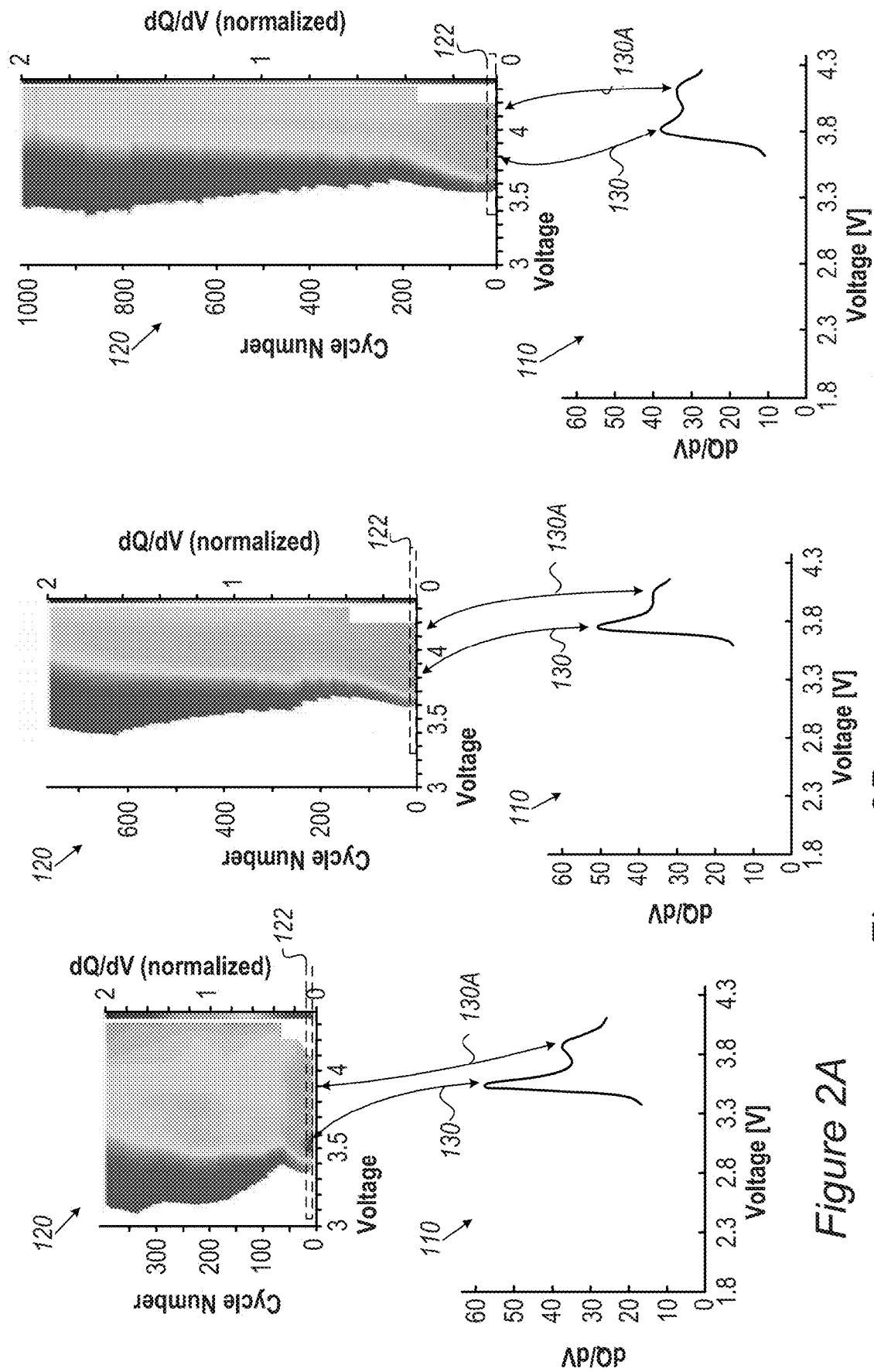

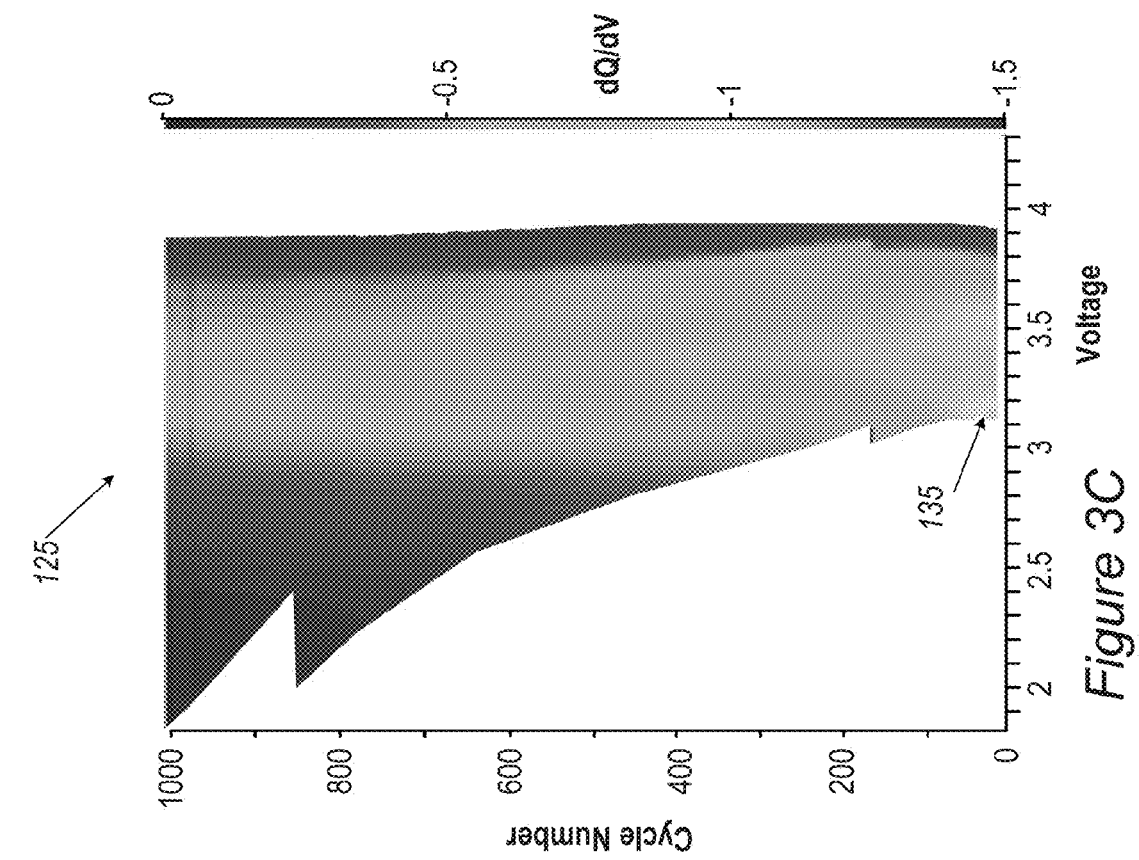
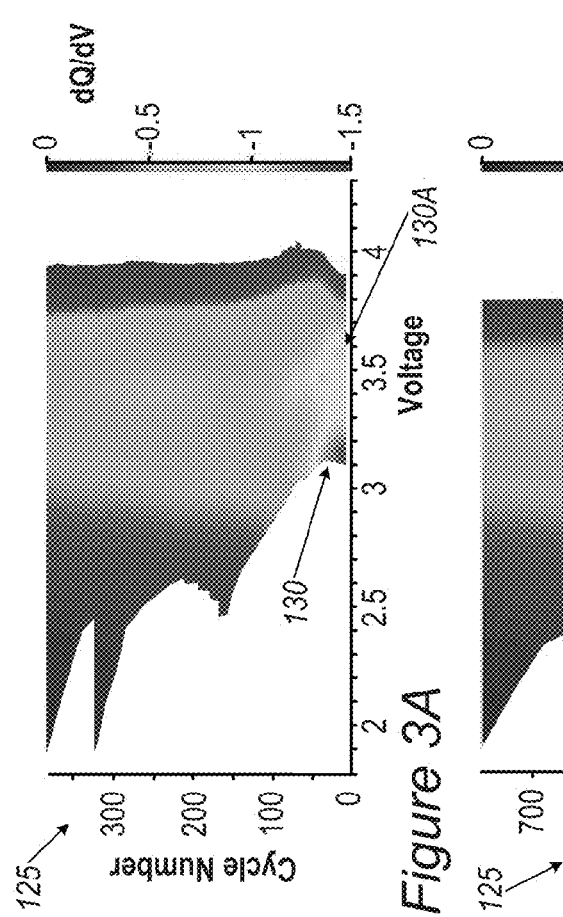
Figure 3A
Figure 3B
Figure 3C

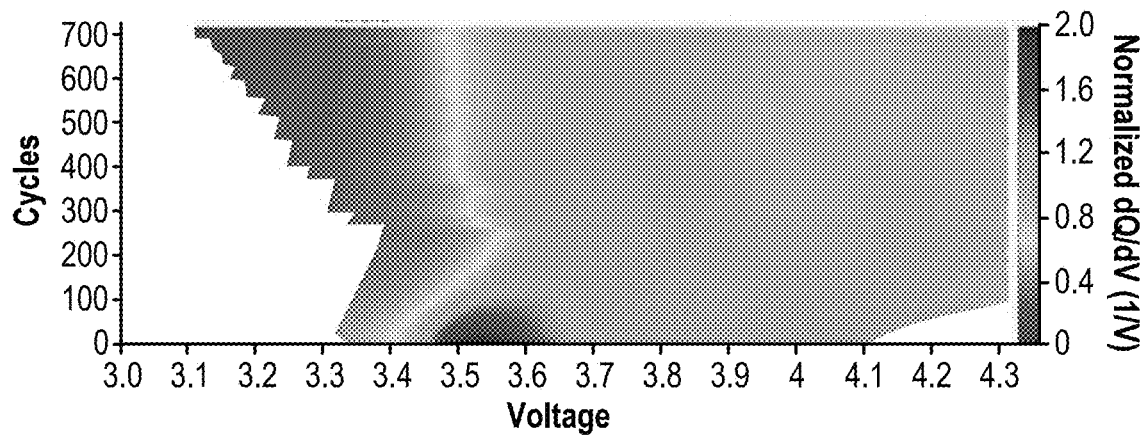
*Figure 8C*
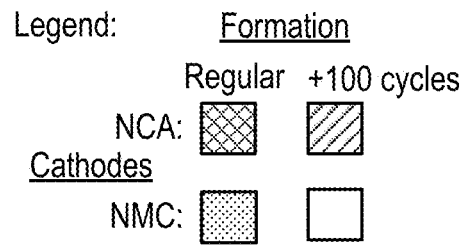
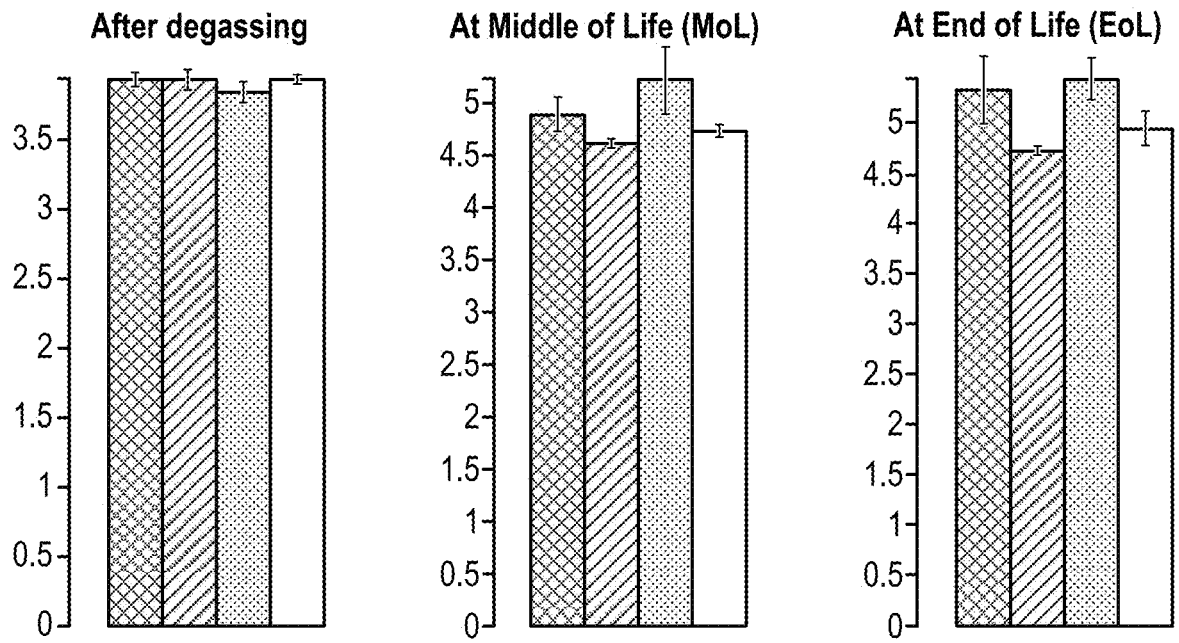
*Figure 8D*

Regular formation + 100 additional formation cycles
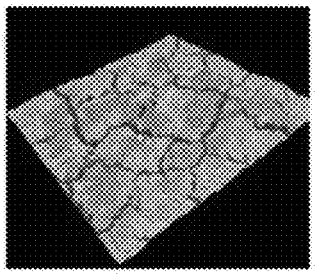 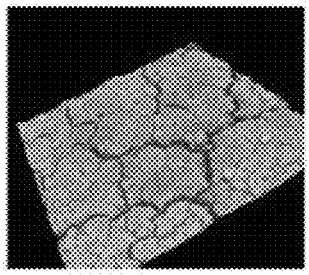
X1000 magnification
Regular formation
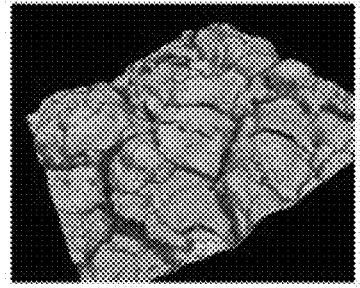
X1000 magnification
*Figure 8E*
Regular formation
+ 100 additional formation cycles
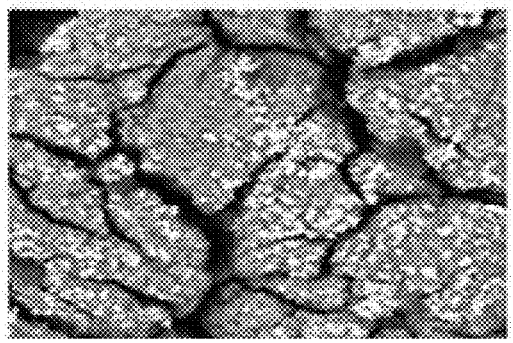
X10000 magnification
Regular formation
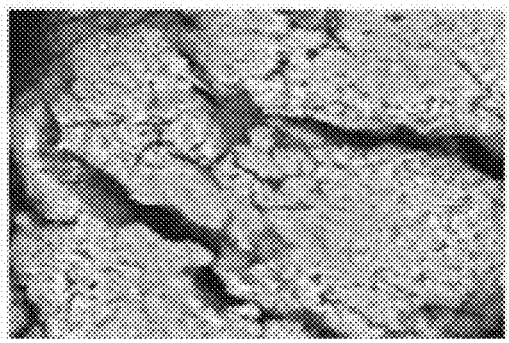
X10000 magnification
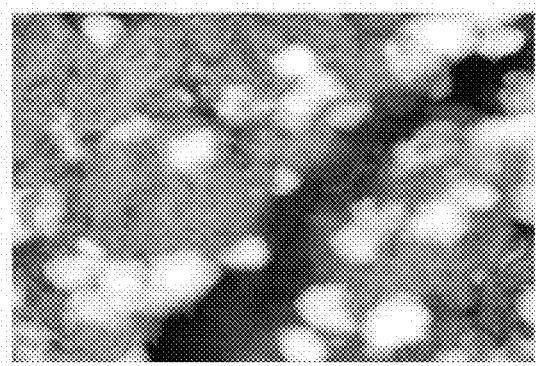
X70000 magnification
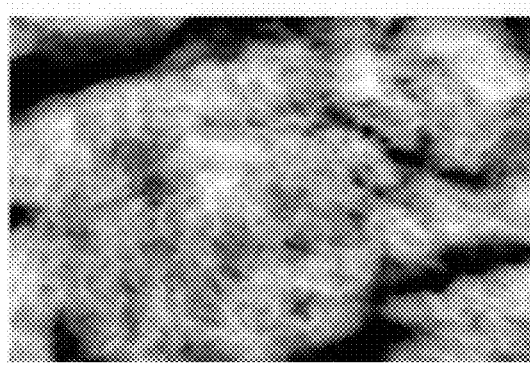
X70000 magnification
*Figure 8F*

USING FORMATION PARAMETERS TO EXTEND THE CYCLING LIFETIME OF LITHIUM ION BATTERIES

CROSS REFERENCE TO RELATED APPLICATIONS

This application in a continuation-in-part of U.S. patent application Ser. No. 16/180,066, filed on Nov. 5, 2018, which is a continuation-in-part of U.S. patent application Ser. No. 15/867,764, filed on Jan. 11, 2018, now U.S. Pat. No. 10,122,042, which in turn claims the benefit of U.S. Provisional Patent Application No. 62/445,299 filed on Jan. 12, 2017; this application also claims the benefit of U.S. Provisional Patent Application No. 62/769,582, filed on Nov. 20, 2018, all of which are hereby incorporated by reference in their entirety.

BACKGROUND OF THE INVENTION

1. Technical Field

The present invention relates to the field of energy storage, and more particularly, to lithium ion batteries.

2. Discussion of Related Art

Metalloid-based lithium ion batteries, having anodes based on metalloids such as silicon germanium and/or tin, have high capacities and can be fast-charged, but present a challenge of cycle lifetime, which is typically a few hundred cycles. Lithium ion batteries typically undergo a process of formation in the production facility, during which its inner structure is stabilized (e.g., through the formation of the SEI—solid-electrolyte interphase layer) and are then operated in user devices, with typical battery operation carried out in charging and discharging cycles that may be composed of constant voltage (CV) and constant current (CC) phases of cycling.

SUMMARY OF THE INVENTION

The following is a simplified summary providing an initial understanding of the invention. The summary does not necessarily identify key elements nor limit the scope of the invention, but merely serves as an introduction to the following description.

In one aspect, the invention comprises a method of formation of a metalloid-based anode for a lithium ion battery. For example, one aspect of the present invention provides a method of extending a cycling lifetime of a lithium ion battery with metalloid-based anodes, the method comprising: monitoring at least one charging and/or discharging peak during a plurality of cycles of a formation process, the charging and/or discharging peak being defined with respect to corresponding dQ/dV measurements during the cycles, and ending the formation process once the charging and/or discharging peak disappears.

One aspect of the present invention provides a method of estimating an expected cell cycling lifetime of a lithium-ion cell, comprising: monitoring at least one charging and/or discharging peak during at least one initial cycle of the cell, the charging and/or discharging peak being defined with respect to a corresponding dQ/dV curve obtained during the at least one initial cycle, and deriving the expected cell cycling lifetime by comparing the at least one monitored peak to a specified threshold, wherein at least one of the monitoring and the deriving is carried out by at least one computer processor.

One aspect of the present invention provides a battery formation method comprising: monitoring at least one charging and/or discharging peak during a plurality of formation cycles of a battery formation stage, the charging and/or discharging peak being defined with respect to corresponding dQ/dV measurements during the cycles, and configuring the formation stage to maintain the charging and/or discharging peak below a specified threshold.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

The application file contains at least one drawing executed in color. Copies of this patent or patent application publication with color drawing(s) will be provided by the Office upon request and payment of the necessary fee.

In the accompanying drawings:

FIGS. 1 and 2A-2C are high-level schematic illustrations of charging cycle maps of dQ/dV curves indicating peaks during the cell charging in each cycle, according to some embodiments of the invention.

FIGS. 3A-3C provide a comparison of discharging maps in the discharging phases of the corresponding three cells, for which charging maps were shown in FIGS. 2A-2C, with respect to their lifetime and peaks in the corresponding dQ/dV curves, according to some embodiments of the invention.

Figure 3D:
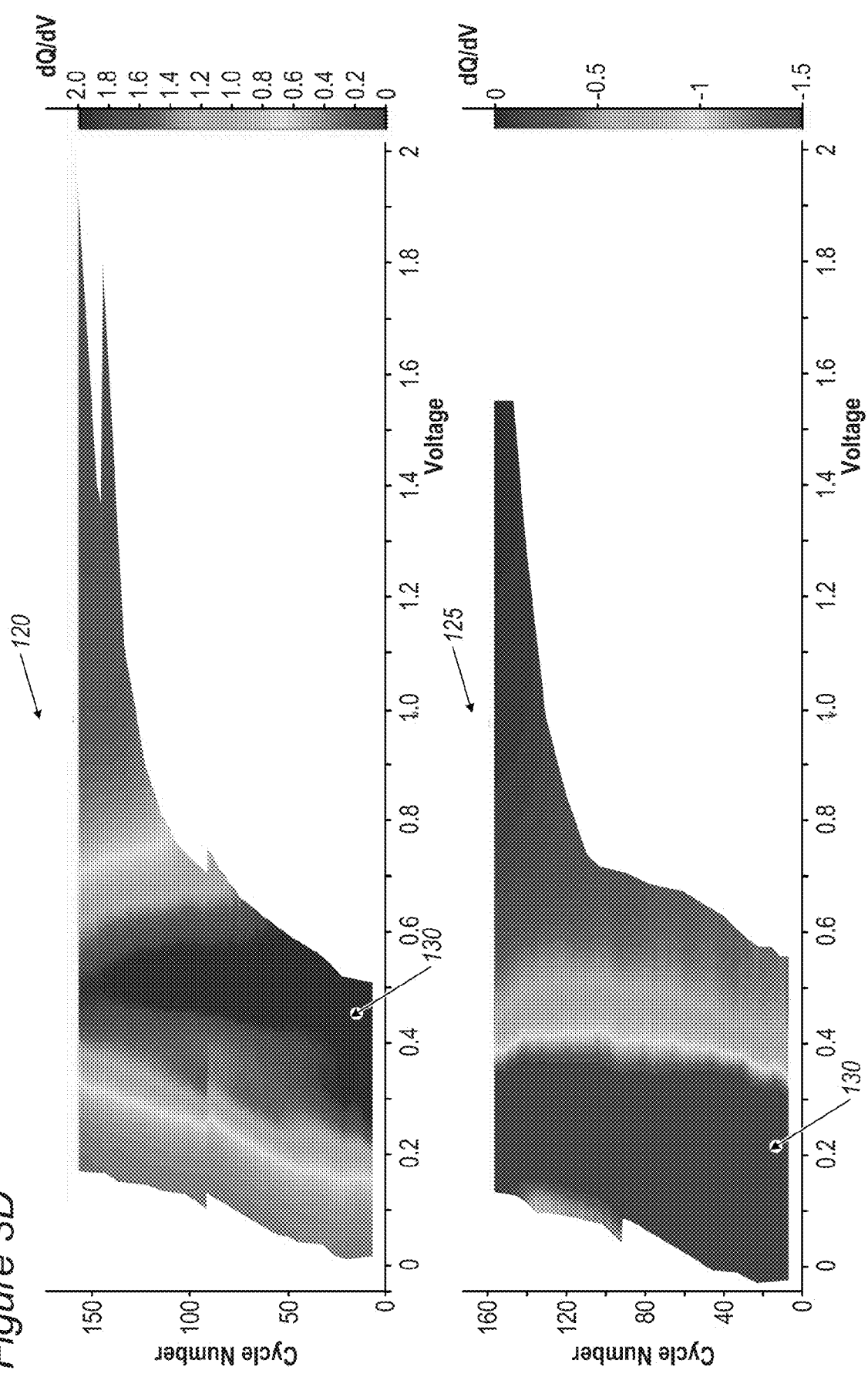
Figure 3E:
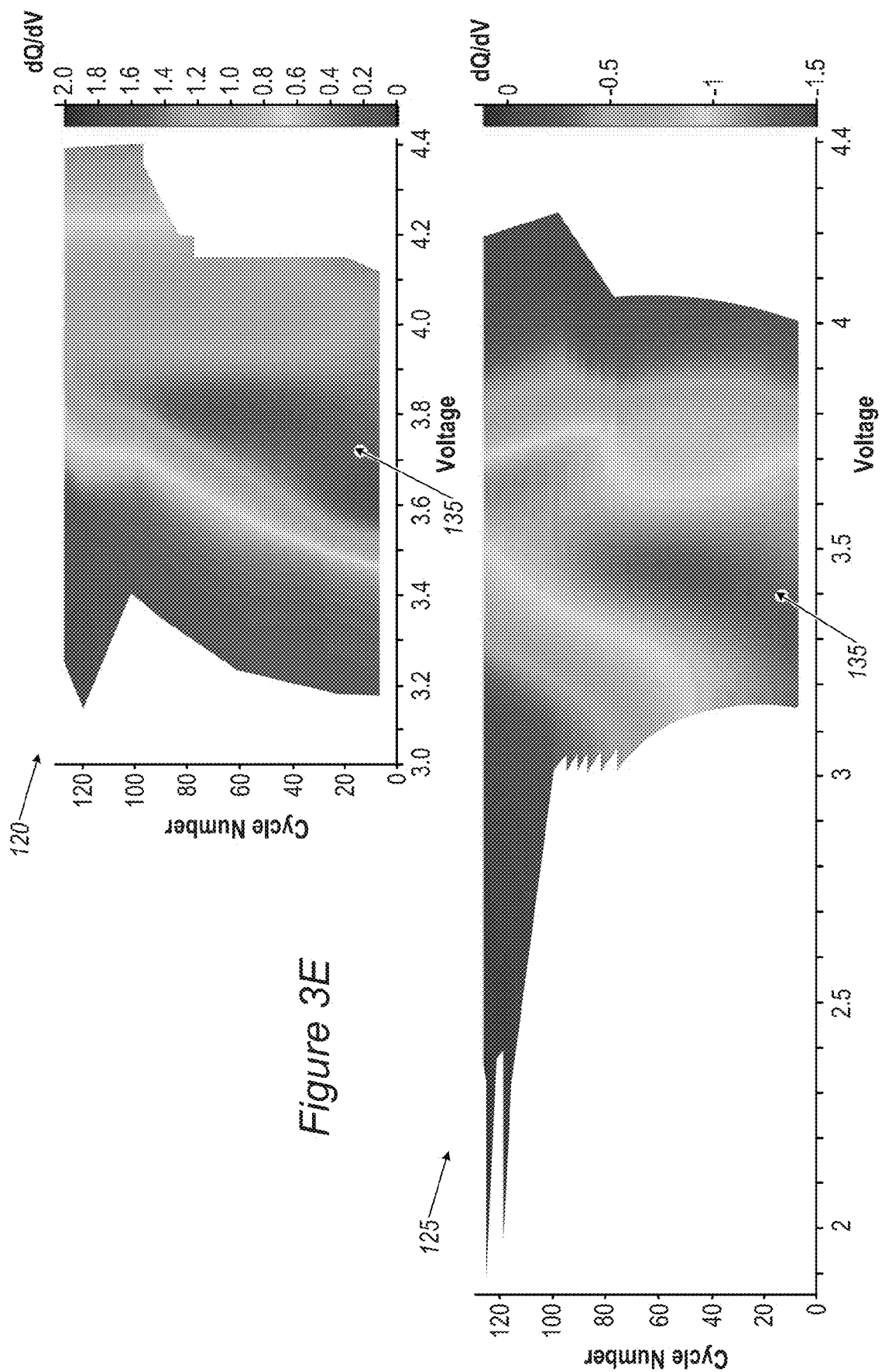

FIGS. 3D and 3E provide a comparison between two corresponding cells, with respect to their charging and discharging dQ/dV curves, and the respective cell lifetime, according to some embodiments of the invention.

Figure 4A:
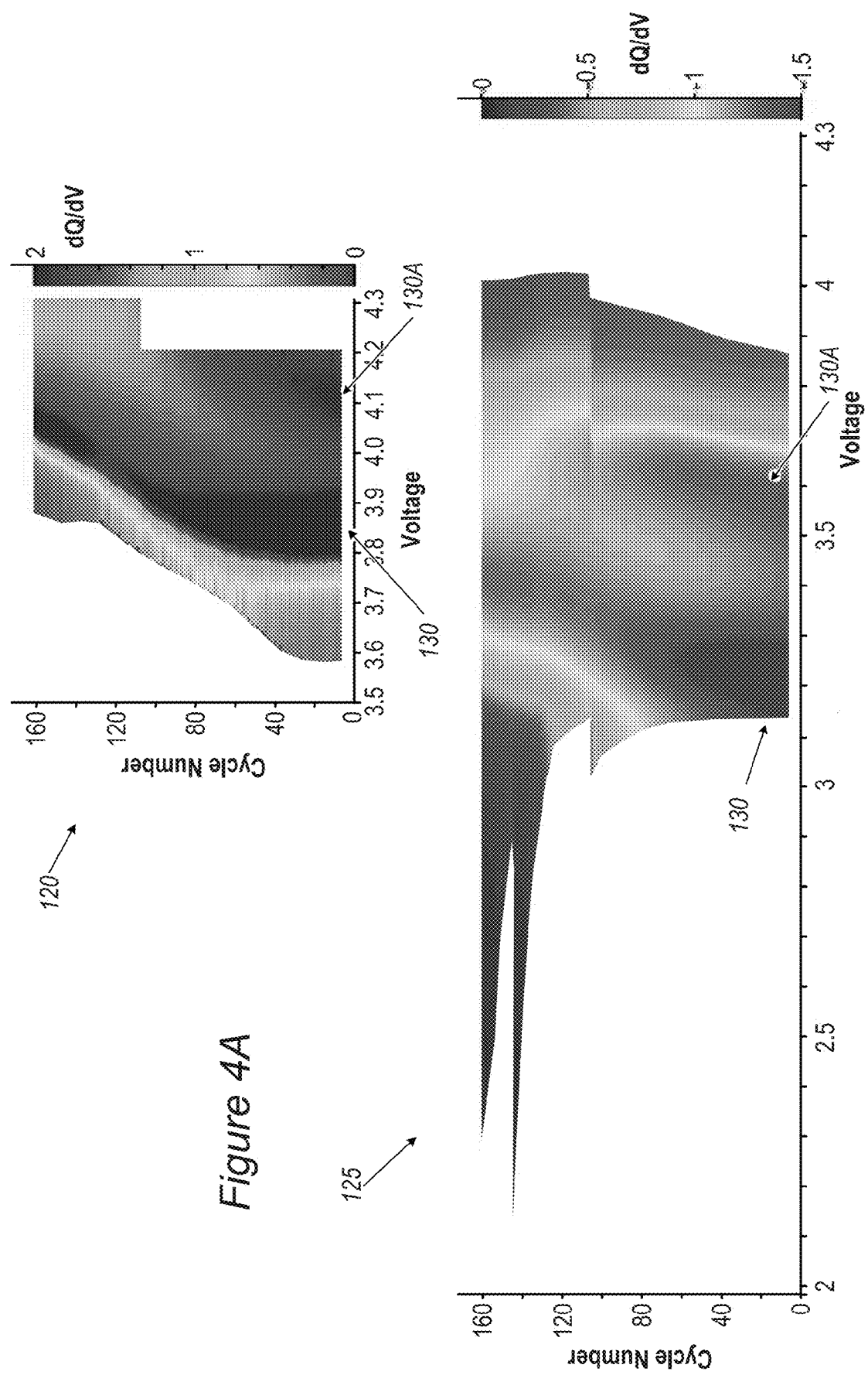
Figure 4B:
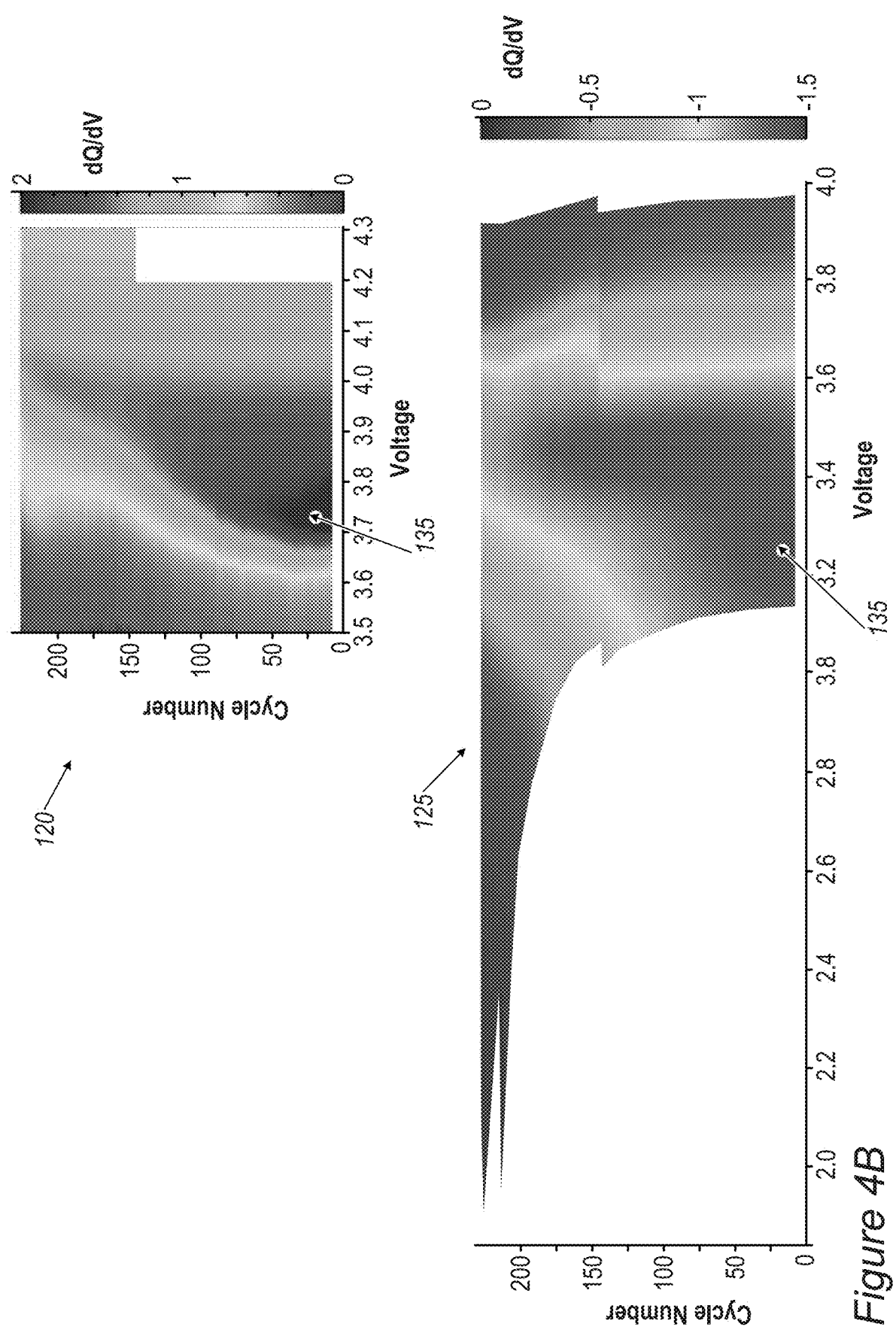
Figure 4C:
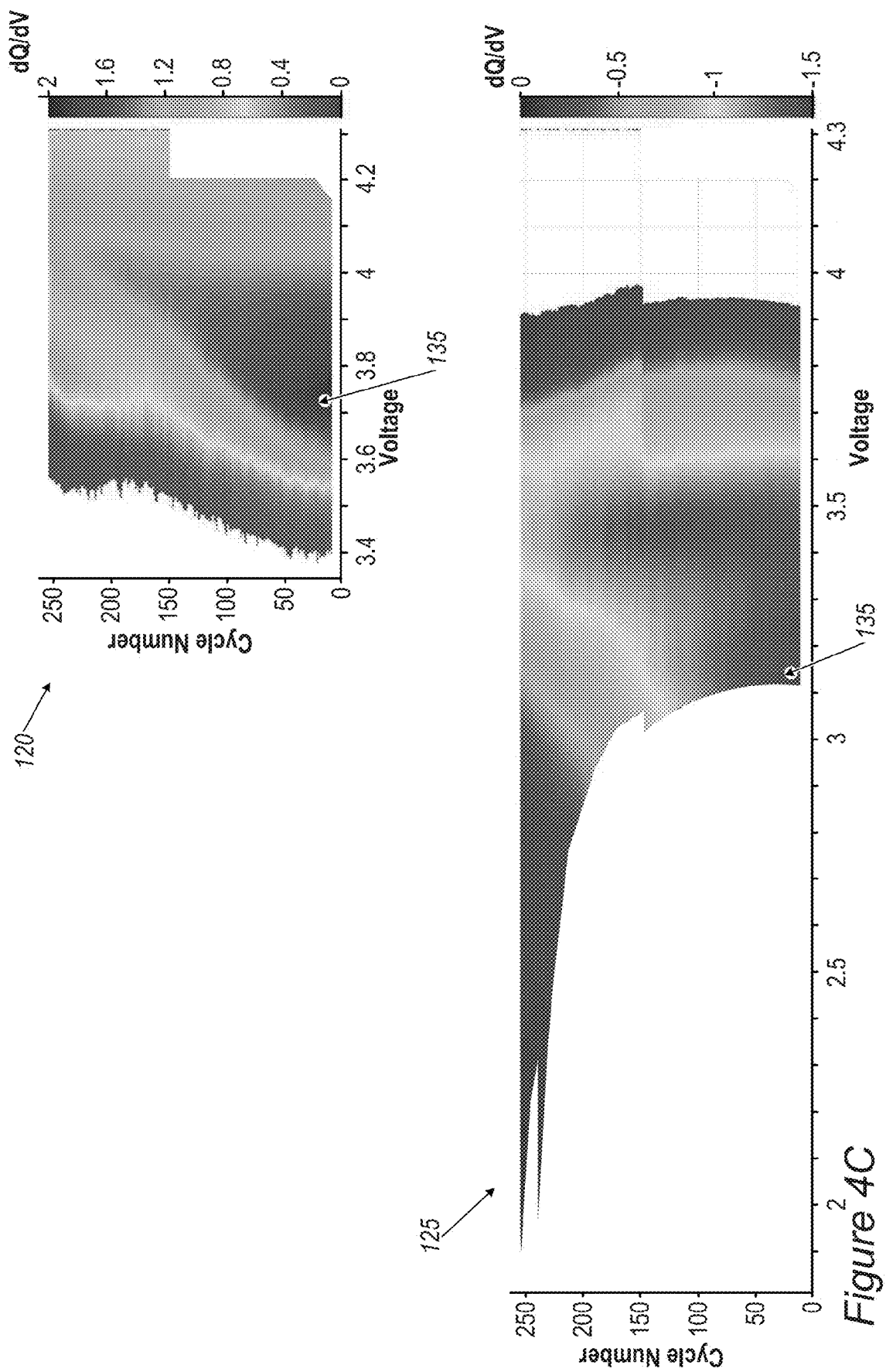

FIGS. 4A-4C provide a comparison between two corresponding cells, with respect to their charging and discharging dQ/dV curves, and the respective cell lifetime, according to some embodiments of the invention.

Figure 5:
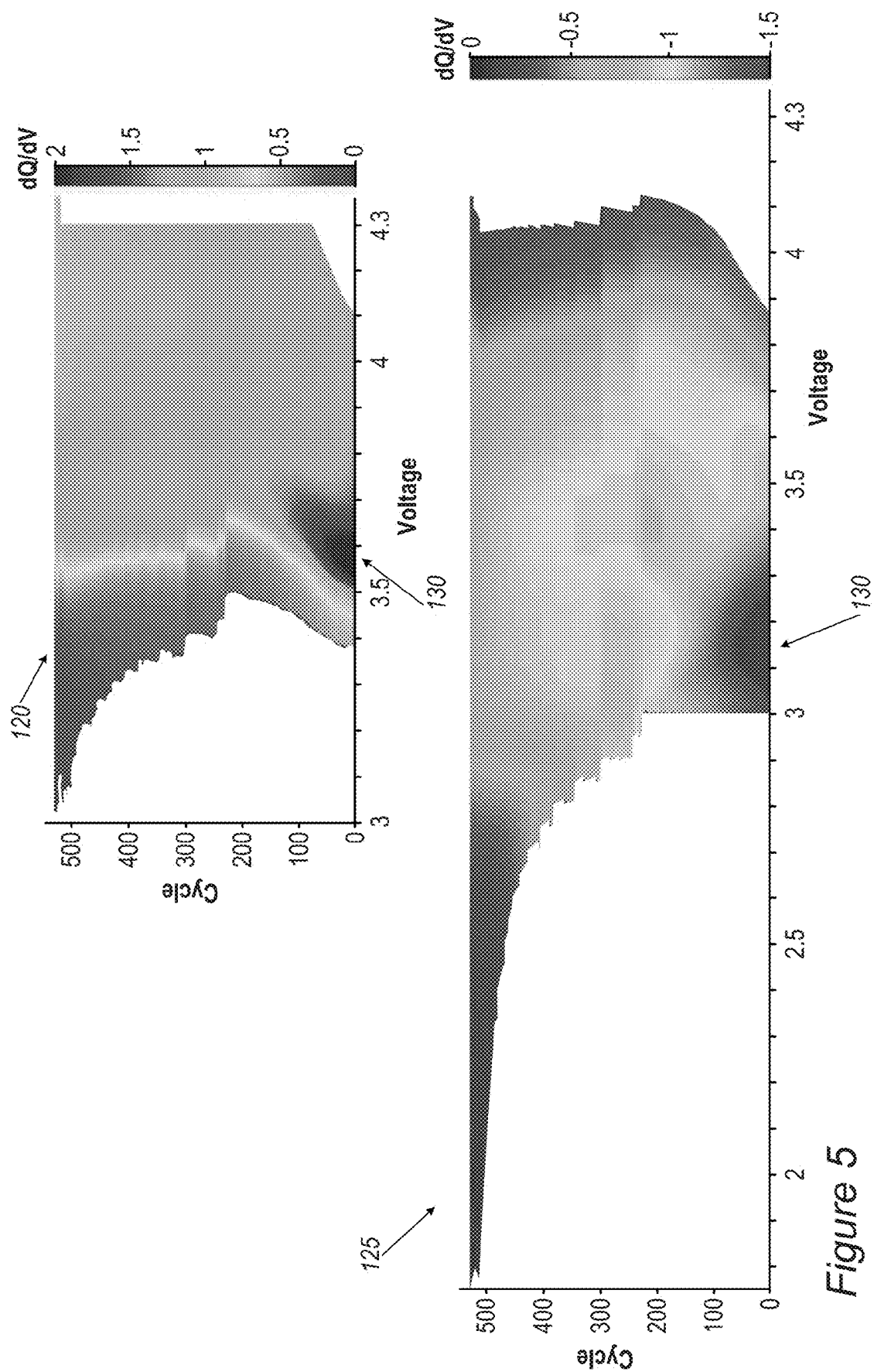

FIG. 5 provides an example for dQ/dV maps for charging and discharging of typical cells, according to some embodiments of the invention.

Figure 6:
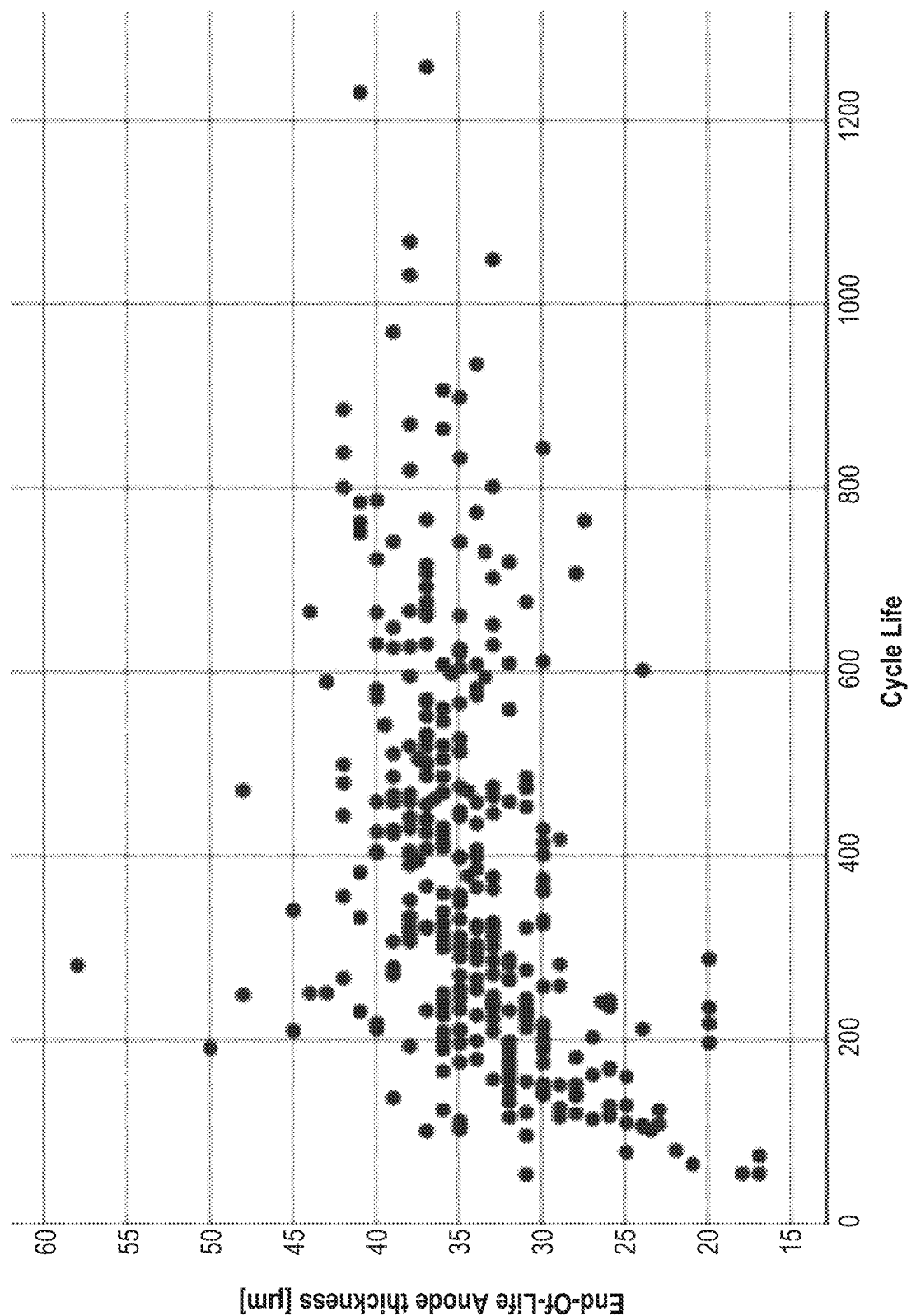

FIG. 6 illustrates experimental results relating the End-Of-Life anode thickness to the cycling lifetime of the cells, according to some embodiments of the invention.

Figure 7A:
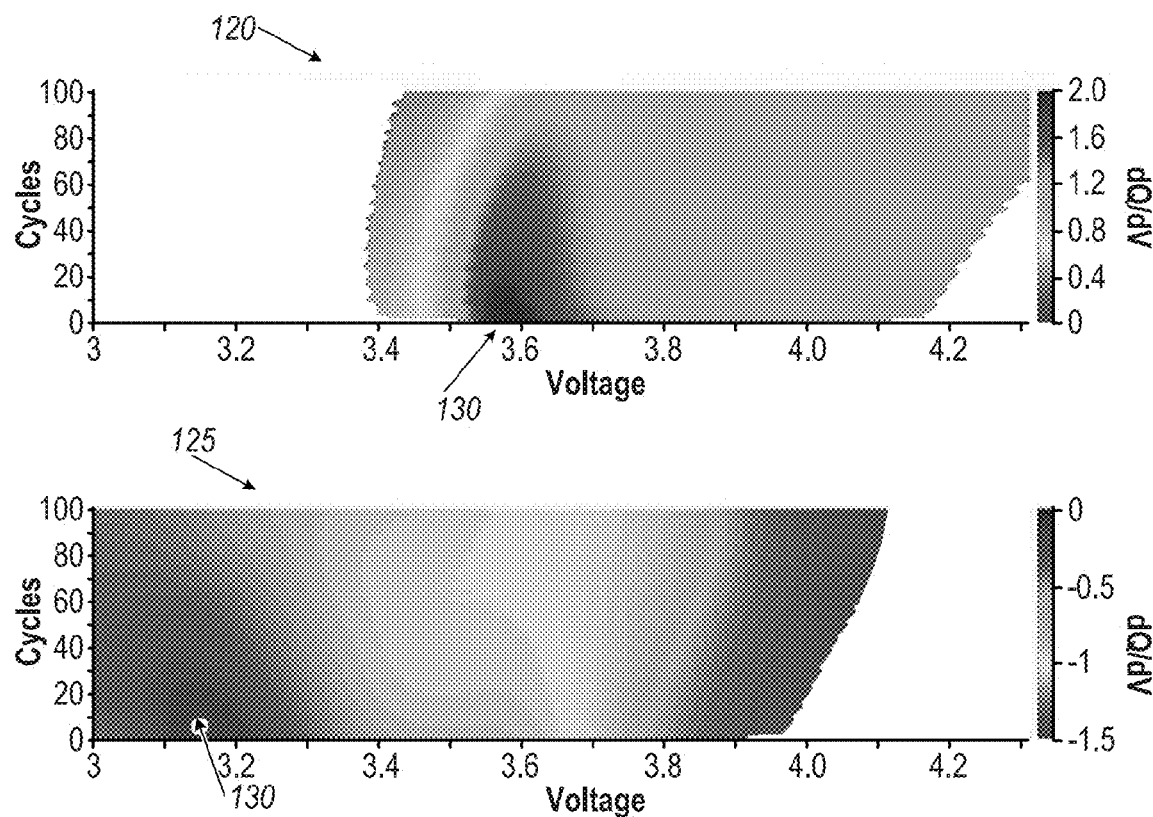
Figure 7B:
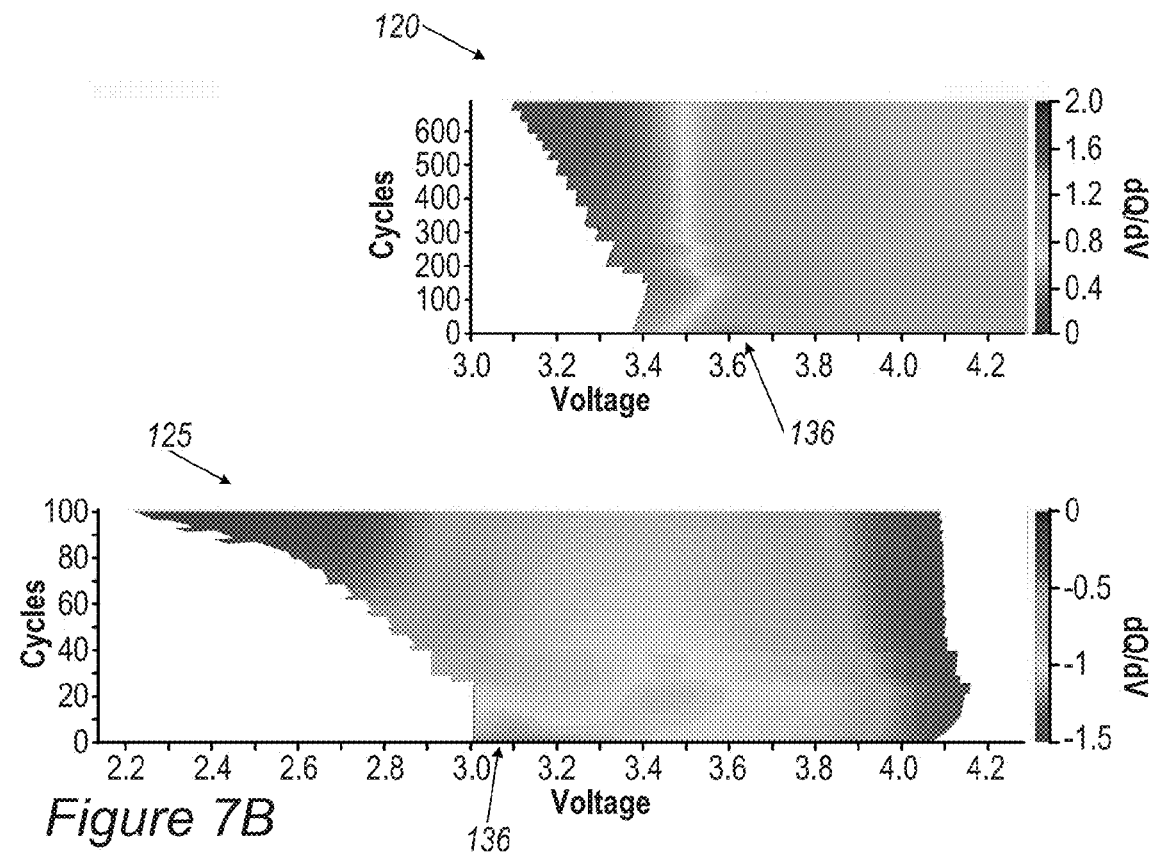

FIGS. 7A and 7B illustrate dQ/dV maps for charging and discharging—for the formation stage and for the operation stage following it, respectively, according to some embodiments of the invention.

FIGS. 8A-8F illustrate multiple comparisons between cells undergoing extended formation (until disappearance of the peaks) and cells undergoing regular formation, according to some embodiments of the invention.

Figure 9A:
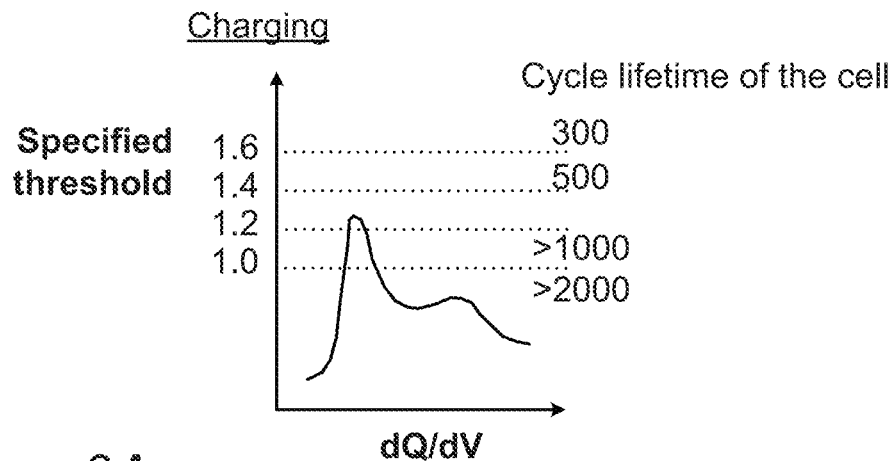
Figure 9B:
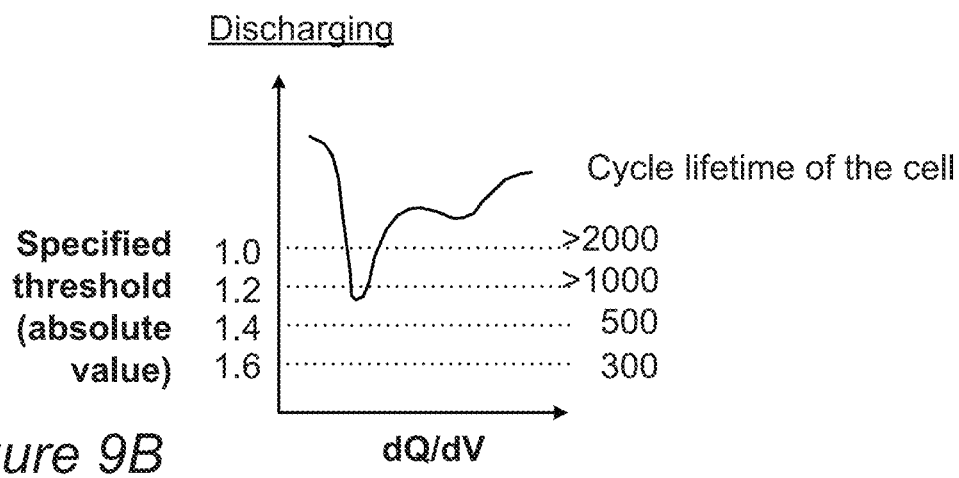
Figure 9C:
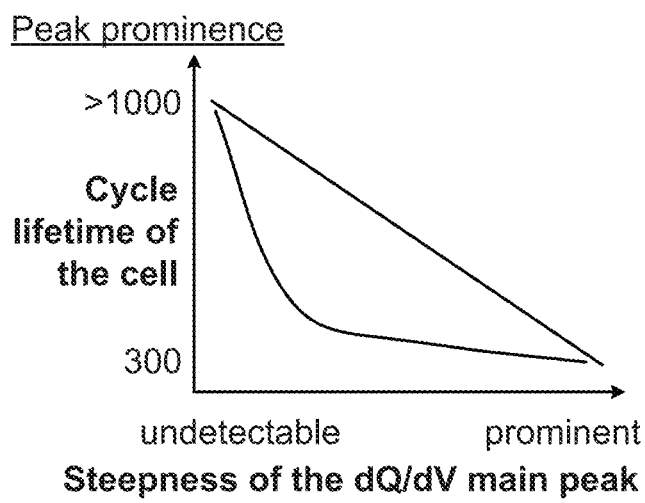

FIGS. 9A-9C illustrate schematically in a qualitative manner, possible associations between the height and/or prominence of the dQ/dV curve peaks and the resulting cycling lifetime of the cells, according to some embodiments of the invention.

Figure 10:
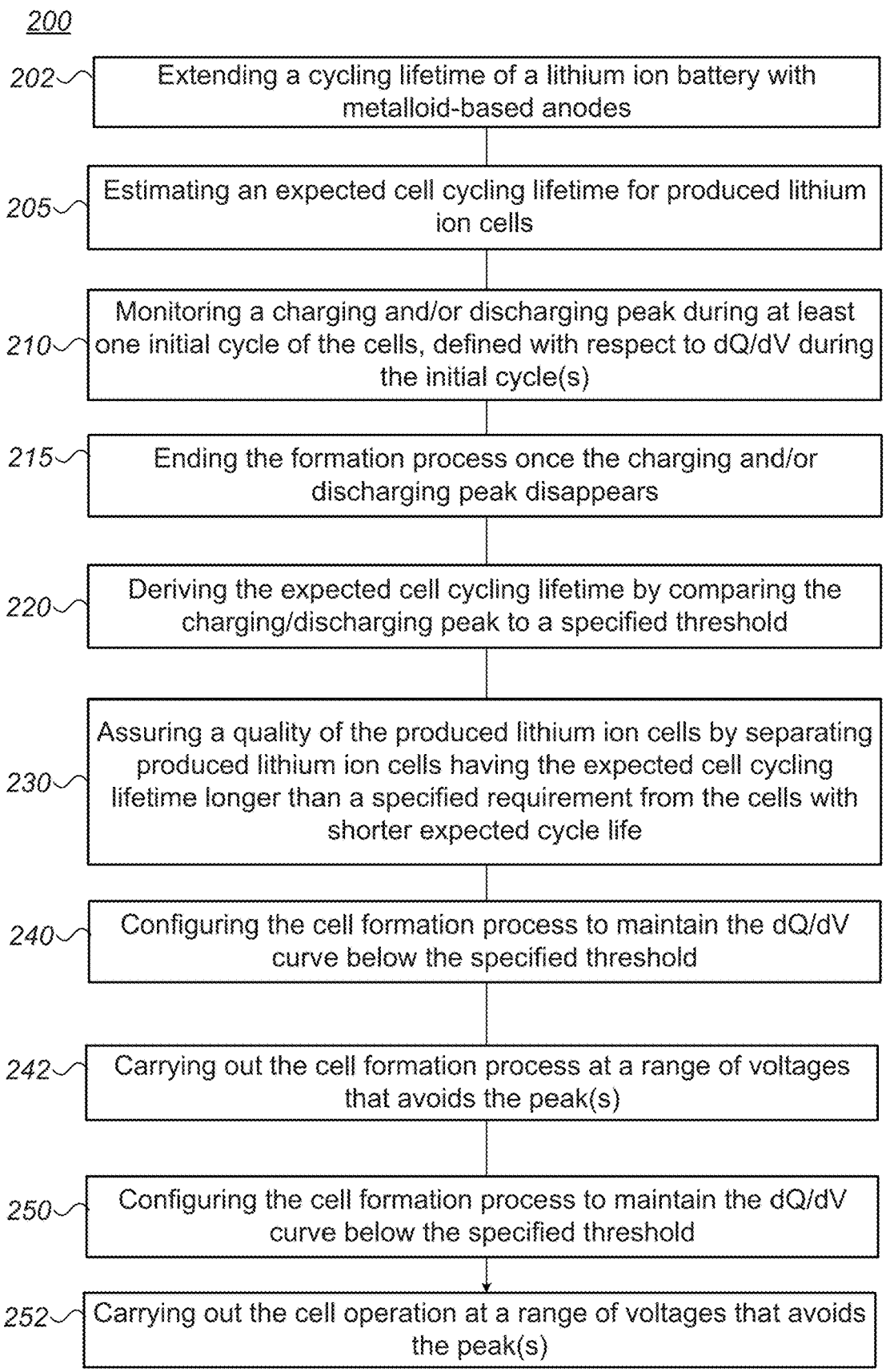

FIG. 10 is a high-level flowchart illustrating a method, according to some embodiments of the invention.

Figure 11:
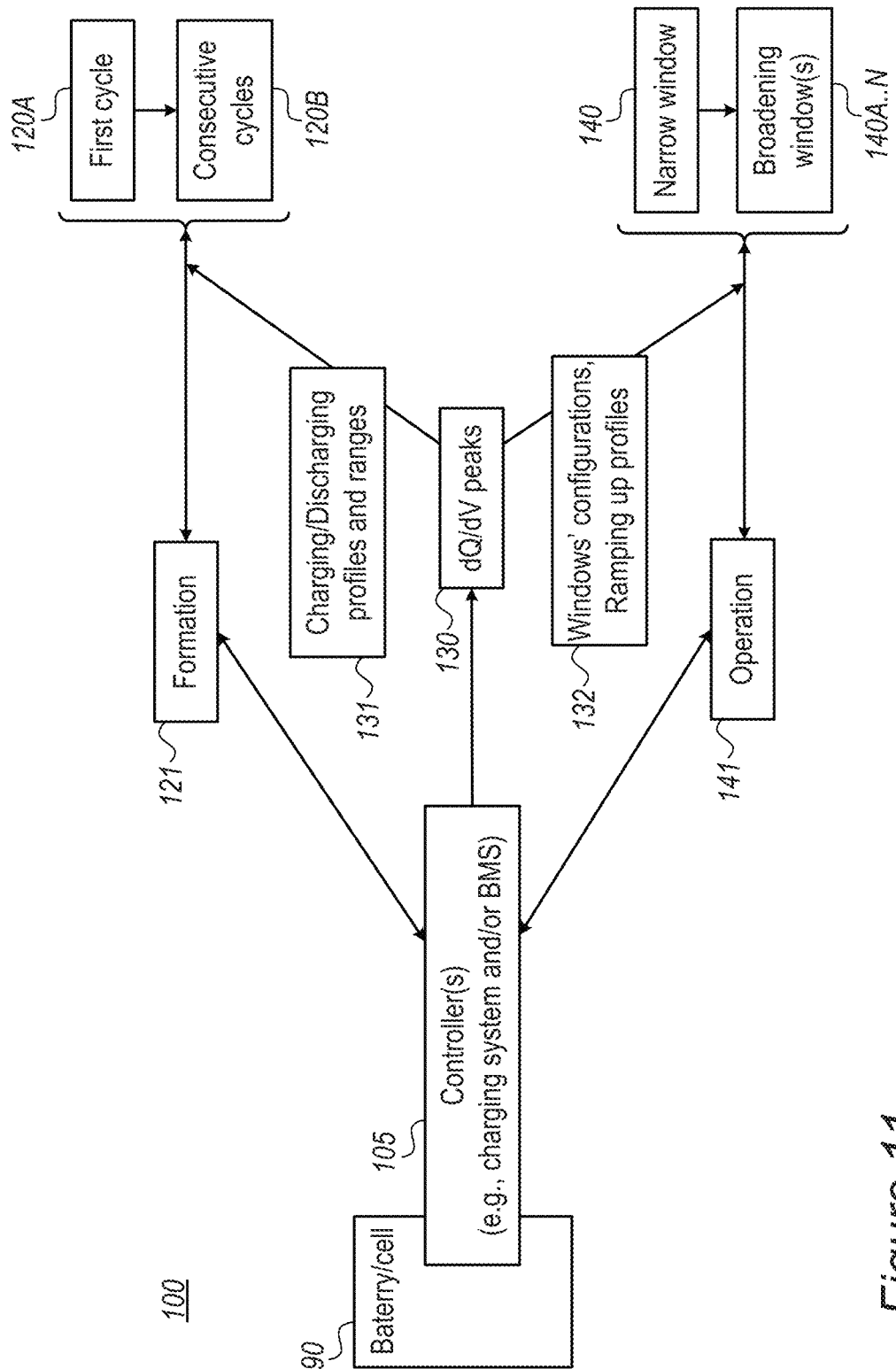

FIG. 11 is a high-level schematic illustration of a system, according to some embodiments of the invention.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing", "deriving" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In certain embodiments, illumination technology may comprise, electromagnetic radiation in the visual range, ultraviolet or even shorter wave radiation such as x rays, and possibly even particle beams.

Embodiments of the present invention provide efficient and economical methods and mechanisms for estimating and extending fast charging lithium ion batteries' cycling lifetime and thereby provide improvements to the technological field of energy storage. Methods and systems are provided for estimating and extending the expected cell cycling lifetime for produced lithium ion cells. Methods comprise monitoring charging and/or discharging peak(s) during formation cycles of the cells, which are defined with respect to dQ/dV measurements during the formation cycles, and ending the formation process once the charging and/or discharging peaks disappear, optionally deriving the expected cell cycling lifetime by comparing the monitored peaks to specified thresholds that are correlated to the lifetime. The methods may be implemented by controller(s) at the battery, device and/or factory levels, which may be operated in combination. Formation processes and/or cell operation schemes may be adjusted accordingly, to avoid excessive dQ/dV rates and increase thereby the cell cycling lifetime.

Disclosed embodiments provide ways to identify processes involved in cycling lifetime reduction, ways to lengthen the battery lifetime as well as quality assurance methods for verifying specified lifetime requirements for produced batteries. Disclosed embodiments may be applicable to lithium ion batteries with metalloid anodes, as well as lithium ion batteries with anodes having other active materials (e.g., graphite, graphene, LTO—lithium titanate, etc.). Disclosed embodiments comprise tools for any of: predicting cell cycling lifetime, deriving criteria for ending the cell formation process at optimal cell lifetime while reducing the duration of the formation stage, as well as optimization of battery formation and operation procedures to extend cell lifetime. In embodiments, the invention is used to estimate battery lifetime of produced lithium ion cells after production and prior to consumer use as a means of quality assurance.

The inventors have found out that monitoring the dQ/dV curve during charging and/or discharging of the batteries, denoting the increase or decrease in charge, Q, as function of the cell voltage, V, may be used to indicate processes in the cell that shorten the cell lifetime, and avoid or attenuate them to increase the cell's lifetime. dQ/dV may be understood as the momentary capacity during the charging or discharging of the cell, with peaks in these curves indicating voltage ranges in which anode charging, or different reactions, occur. The inventors further suggest that the more gradual the changes of the momentary capacity are, the longer the cell lifetime is estimated to be, possibly due to prevention of damages to the SEI during its formation process, which are associated with abrupt changes in the momentary capacity. Possibly, additional graphs may be monitored during the charging and/or discharging steps, such as the voltage (during the CC stage), current (during the CV stage) or charge dependence on the time, and corresponding derivatives may be used to monitor the battery state. It is noted that dQ/dV peaks represent regions where the voltage response to the current is weak during charge, e.g., when current is applied but the voltage does not change much. It is noted that the dQ/dV peaks are identified as local maxima in the values (or normalized values) of dQ/dV with respect to charging and/or discharging, over a formation (or an operation) cycle of the cell.

Certain embodiments comprise methods of estimating, for produced lithium ion cells, an expected cell cycling lifetime by: (i) monitoring charging and/or discharging peak(s) during at least one initial cycle of the cells, the charging/discharging peak(s) defined with respect to dQ/dV during the at least one initial cycle (e.g., possibly normalized by the cell's capacity or by its total charge), and deriving the expected cell cycling lifetime by comparing the charging peak to a specified threshold. For example, the specified threshold may be a peak value of any of 1.0, 1.2, 1.3, etc. (in 1/V units, when normalized with respect to the cell's capacity). Put differently, certain embodiments comprise monitoring dQ/dV during charging and/or discharging cycle(s) of the formation process, and using voltages associated with the maximal values of the monitored dQ/dV to either—control the formation process, preventing dQ/dV values above the specified threshold and/or using the maximal values of the monitored dQ/dV as a quality control tool to estimate the expected cycling lifetime of the corresponding cell(s).

Methods may further comprise assuring a quality of the produced lithium ion cells by separating produced lithium ion cells having the expected cell cycling lifetime longer than a specified requirement (e.g., 500, 700, 1000 or more hours) from the cells with shorter expected cycle life.

It is noted that disclosed embodiments handle and at least partly solve the central challenge of achieving fast-charging lithium ion batteries with long-enough cycling lifetime, typically required to constitute several thousand cycles.

Figure 1:
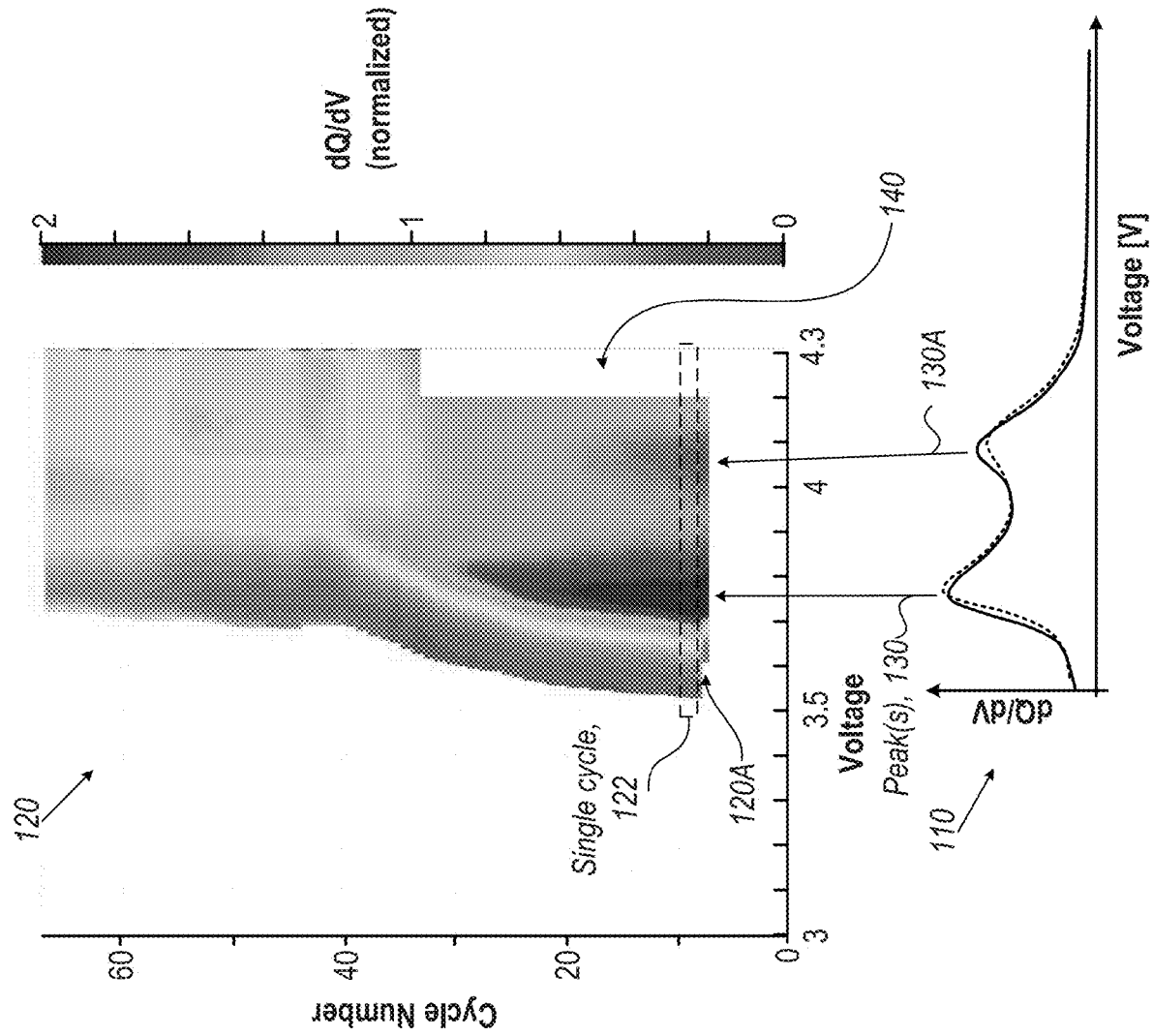

FIGS. 1 and 2A-2C are high-level schematic illustrations of charging cycle maps 120 of dQ/dV curves 110 indicating first and second (or additional) peaks 130, 130A, respectively, during the cell charging in each cycle 122, according to some embodiments of the invention. FIG. 1 illustrates schematically a way of monitoring and presenting dQ/dV curves 110 during charging, according to some embodiments of the invention. FIG. 1 illustrates a plurality of dQ/dV curves 110 which are measured over all the formation and operation cycles of the lithium ion battery and presented in color map 120 in color code, with blue indicating high normalized values of dQ/dV (high rates of change of the cell charge) and red indicating low normalized values of dQ/dV (low rates of change of the cell charge).

The normalization of the dQ/dV values (which are measured in mAh/V and equivalent to capacitance) is carried out with respect to the cell's cycling capacity (in mAh), to make difference cells comparable and to provide generalized procedures and data. For example, in FIG. 8C below, the dQ/dV peak value at cycle 15 is 1350 mAh/V and the cell's capacity is 1050 mAh hence the displayed dQ/dV peak value is about 1.3 1/V. It is emphasized, that while much of the cycling maps are presented in terms of color-coded normalized dQ/dV values, the normalization itself does not limit the implementation of the invention in the sense that raw dQ/dV data and/or dQ/dV modified in a different way may be used to identify and/or quantify the peaks. Moreover, the dQ/dV values may be used in different ways to define the required extent of the formation stage. All such modifications are considered part of the present invention.

The normalization provides the relation between the rate and the overall capacity, e.g., the darkest blue color (indicating dQ/dV=2 1/V) shows the voltage value in which the rate of charge accumulation is double the capacity value. While reference herein to dQ/dV curves is understood as use of normalized dQ/dV data, it is noted that dQ/dV data which is not normalized can also be used similarly, e.g., for cells with equal capacities, or using a different normalization scheme. It is further understood that the normalization of the dQ/dV data or its type do not limit the scope of the invention.

It is noted that during the formation stage, an initial narrow range of voltage 120A is used (starting from 3.6V), while later voltage range is broadened (starting from 3.5V) and that during operation of the depicted cell, the voltage range of operation widens from an initial narrow range of operation 140 (with 4.2V as maximal voltage) to a full range of operation (with 4.3V as maximal voltage)—as explained below (see FIG. 11). In certain embodiments, low voltage values may be selected with respect to the associated cell resistance and its dependence on the voltage.

It is noted that the peak values and/or their visualization may be normalized with respect to initial capacity or current capacity of the cells, or possibly with respect to the overall (initial or current) charge. In certain embodiments, normalization may be carried out with respect to other cells parameters, such as its capacitance, and analysis of the peaks may be carried out along similar lines.

FIGS. 2A-2C provide a comparison between three cells, with respect to their lifetime and peaks in the dQ/dV curves, according to some embodiments of the invention. The bottom part of each figure illustrates a representative dQ/dV curve from the formation stage of the respective cell. FIGS. 2A, 2B and 2C illustrate, respectively, cells with total lifetimes of 396, 763, 1013 cycles, with corresponding high normalized peaks 130 (ca. 1.8 and 1.6 respectively) as well as second (or additional) peaks 130A of dQ/dV curves 110 in FIGS. 2A and 2B, and low normalized peaks 130 (ca. 1.2) of dQ/dV curves 110 in FIG. 2C, coinciding with the longest cell lifetime. Peaks 130 providing acceptable cycling lifetime of the cell are denoted by numeral 135 (as in FIG. 3C). Moreover, the inventors note that the quicker the dQ/dV peaks fade during consecutive cycles, the longer is the eventual lifetime of the cell. The inventors conclude that less significant initial dQ/dV curve peaks and quicker fading thereof are correlated with longer cycling lifetimes of the cells—providing methods to estimate the cell quality and eventual lifetime of the cells, as well as indicating formation processes which may operate to cause the steep peaks and may correspondingly cause for cell degradation during operation. Moreover, the formation process may be conducted to minimize peaks 130 and possibly avoid second peaks 130A as disclosed below.

FIGS. 3A-3C provide a comparison of discharging maps 125 in the discharging phases of the corresponding three cells, for which charging maps 120 were shown in FIGS. 2A-2C, with respect to their lifetime and peaks in the corresponding dQ/dV curves, according to some embodiments of the invention. FIGS. 3A, 3B and 3C illustrate, respectively, the same cells with total lifetimes of 396, 763, 1013 cycles, with corresponding high normalized peaks 130 (ca. −1.4 and −1.3 respectively) of the discharging dQ/dV curves in FIGS. 3A and 3B, and low normalized peaks 135 (ca. −1) of the discharging dQ/dV curves in FIG. 3C, coinciding with the longest cell lifetime. It is noted that the terms high and low relate to the absolute value of the respective normalized peak, with relation to specified threshold (e.g., 1.0, 1.2 or 1.3 1/V in some cases).

FIGS. 3D and 3E provide a comparison between two corresponding cells, with respect to their charging and discharging dQ/dV curves 120, 125, respectively, and the respective cell lifetime, according to some embodiments of the invention. In both cases, the cell anodes are with Si-based anode material. FIG. 3D relates the dQ/dV curves to the anode voltage and ran for 156 cycles while FIG. 3E relates the dQ/dV curves to the cell voltage and ran for 125 cycles.

FIG. 3D illustrates charging and discharging maps 120, 125, respectively, for cells having a cycling lifetime of ca. 160 cycles, with maps 120, 125 showing large peaks 130 in both charging and discharging. FIG. 3E illustrates charging and discharging maps 120, 125, respectively, for cells having a cycling lifetime of ca. 125 cycles, with maps 120, 125 showing much less prominent peaks 135 in both charging and discharging.

FIGS. 4A-4C provide a comparison between two corresponding cells, with respect to their charging and discharging dQ/dV curves 120, 125, respectively, and the respective cell lifetime, according to some embodiments of the invention. In all three cases, the cell anodes are with Si—Ge-Graphite-based anode material with proportions between the anode materials of 40:40:20, 50:20:30 and 60:30:10, respectively, and C:A ratios (cathode to anode capacity ratios) of 1.16, 1.0 and 0.53, respectively. The illustrated cells had total lifetimes of 160, 225 and 253 cycles for corresponding FIGS. 4A, 4B and 4C.

FIG. 4A presents a cell with high normalized dQ/dV peaks, reaching 2 in charging and 0 in discharging, way above the respective specified thresholds. FIG. 4B presents a cell with lower and more ephemeral peak 135, which fades away faster that in FIG. 4A, and corresponds to the longer cell lifetime. In FIG. 4C, peaks 135 are still shallower and less prominent, corresponding to the further extended cycling lifetime.

It is noted that FIGS. 2A-2C, 3A-3E and 4A-4C exemplify the changing of the voltage ranges for the formation cycles and for the operation cycles. In various embodiments, these ranges may be change with respect to the peak characteristics to increase the cell cycling lifetime. For example, the charging and/or discharging of the cell may be performed or stopped at specific voltage values and/or performed over specific (partial) voltage ranges which avoid the appearance of peaks 130. In certain embodiments, these specific values may be determined experimentally using the dQ/dV curves and be modified with the number of cycles as the peak(s) are attenuated and/or move.

In certain embodiments, formation and/or operation may be modified to avoid second peak 130A, as seen e.g., in FIGS. 1, 2A-2C, 3A and 4A, to increase the cell cycling lifetime.

In certain embodiments, the formation process may be extended to multiple cycles (e.g., from 1 to 5 or from 2-3 to 10-20 full or partial formation cycles) to complete cycling until the disappearance of peaks 130 in a controlled environment, at low C rates and/or low currents, rather than under regular high-C operation—to extend the cell cycling lifetime. In a non-limiting example, a second formation stage may be performed at C/2 or even at lower currents, e.g., C/10.

FIG. 5 provides an example for dQ/dV maps for charging 120 and discharging 125 of typical cells, according to some embodiments of the invention. Peaks 130 are observed and are most pronounced during the first cycles of charging and discharging the cells. Peaks 130 fade gradually with cell cycling, becoming less significant after ca. 100 cycles and completely disappear after ca. 150 cycles. In certain embodiments, the battery formation stages may be performed until the disappearance of peaks 130, which was found by the inventors to increase the cell's cycling lifetime. The formation stage, in this case under pressure of 15 bar and followed by degassing, was found to prepare cells with increased cycling lifetime with respect to cells that had shorter formation stages.

FIG. 6 illustrates experimental results relating the End-Of-Life anode thickness to the cycling lifetime of the cells, according to some embodiments of the invention. The data presented in FIG. 6 is taken from a large number of cells that were cycled under varying conditions, typically with a formation stage of few cycles, and reaching their end of life for various reasons. In most cases the cells included Ge-based anodes, NMC-based cathodes and VC-based electrolyte. Operation stage cycling procedure was 8C charging, 1C discharging at initial voltage range of 3-4.3V.

The inventors have found out that the maximal average anode thickness of 35-40 μm is reached for cycling lifetimes of 150-200 cycles, and remains constant for cells with longer cycling lifetime, extending up to ca. 1200 operation cycles. Accordingly, the inventors conclude that formation stages of 150-200 cycles may yield cells with anode thickness that would not change much following consequent operation. Moreover, the results may be understood to indicate that the disappearance of peaks 130 is related to the stabilization of the anode thickness. Alternatively or complementarily, the decrease in the slope of increasing anode thickness around cycles 150-200 may be understood as indicating anode stabilization leading to increased cycling lifetime. The results were derived by measuring anode thickness in opened pouches at the end of their cycling lifetime (capacity reduction to 80% of the beginning of cycling, at high C rate charging.

For example, in certain embodiments, the formation stage may include few (e.g., five, or between 1-10) cycles with low current, followed by additional 100-200 cycles at 8C charging and 3C discharging, all performed with cells under pressure.

The inventors note that stable anode thickness during battery operation may contribute to the cycling lifetime extension mechanically and/or electrochemically, e.g., indicating any of: conclusion of SEI formation, conclusion of structural changes in the anodes, enhanced mechanical stability of the anodes, reduction of electrolyte consumption and/or stabilization of the lithium ion levels that may stay constant during operation. In certain embodiments, following formation, lithium ions may be added to any of the cell components (e.g., via lithiation of electrodes and/or via exchanging the electrolyte, as disclosed e.g., in U.S. Patent Application Publication No. 2019/0089015, incorporated herein by reference in its entirety).

FIGS. 7A and 7B illustrate dQ/dV maps for charging 120 and discharging 125—for the formation stage and for the operation stage following it, respectively, according to some embodiments of the invention. The first 100 cycles in a formation stage (FIG. 7A), carried out under a pressure of 15 bar and ending with degassing, were followed by ca. 700 cycles of operation (FIG. 7B), which provide a long cycling lifetime that starts with minimal operation peaks 136. It is noted that peaks 136 may reappear, typically small, during the operation stage, although peaks 130/135 disappear during the formation stage, as the operation conditions typically differ from the formation conditions and/or due to additional processes such as the degassing. For example, battery capacity may rise somewhat (in the illustrated example by ca. 50 mAh) and resistance may decrease somewhat due to the degassing—possibly providing some additional reactivity at the beginning of operation that may result in some additional slight morphological changes in the anode during the beginning of the operation stage. The formation stage cycling of the cells was carried out for 100 cycles, followed by degassing, and the operation stage was carried out at 8C charging and 1C discharging rates. The cells included Ge-based anodes, NMC-based cathodes and VC-based electrolyte.

Certain embodiments comprise methods of extending a cycling lifetime by monitoring charging and/or discharging peaks 130 during the formation process and ending the formation process once charging and/or discharging peaks 130 disappear—with respect to their surroundings, e.g., peaks 130 being less than any of 20%, 10%, 5% or intermediate values above their surrounding; and/or with respect to their absolute values, e.g., peaks 130 being less than any of 1.3, 1.2, 1.1, 1.0 1/V or intermediate values. Alternatively or complementarily, the formation process may be defined as comprising at least any of 100, 150, 200 cycles, or intermediate values, e.g., based on calibration experiments for specific battery types. It is noted that the disappearance of the peaks can be defined with respect to specified requirements, and the exact definition does not limit the scope of the disclosed invention. For example, in the data presented below, the disappearance of the dQ/dV peak was defined as the cycle in which the dQ/dV value drops below 60% of initial dQ/dV value, as defined by an average of dQ/dV peak values over at cycles 2 to 6. Clearly, modifications of this definition may be used in a similar manner, depending on the experimental system and the requirements concerning the formation and/or operation processes.

FIGS. 8A-8F illustrate multiple comparisons between cells undergoing extended formation (until disappearance of the peaks 130) and cells undergoing regular formation, according to some embodiments of the invention. Regular formation (first cycle of charging at step-wise increasing low current and discharge at C/5, followed by four additional cycles with charging and discharging of the cells at 1C rates) is compared with regular charging followed by additional 100 fast formation cycles (8C charging, 3C discharging, maintaining the mechanical pressure of the regular), both formation alternatives followed by degassing.

Figure 8A:
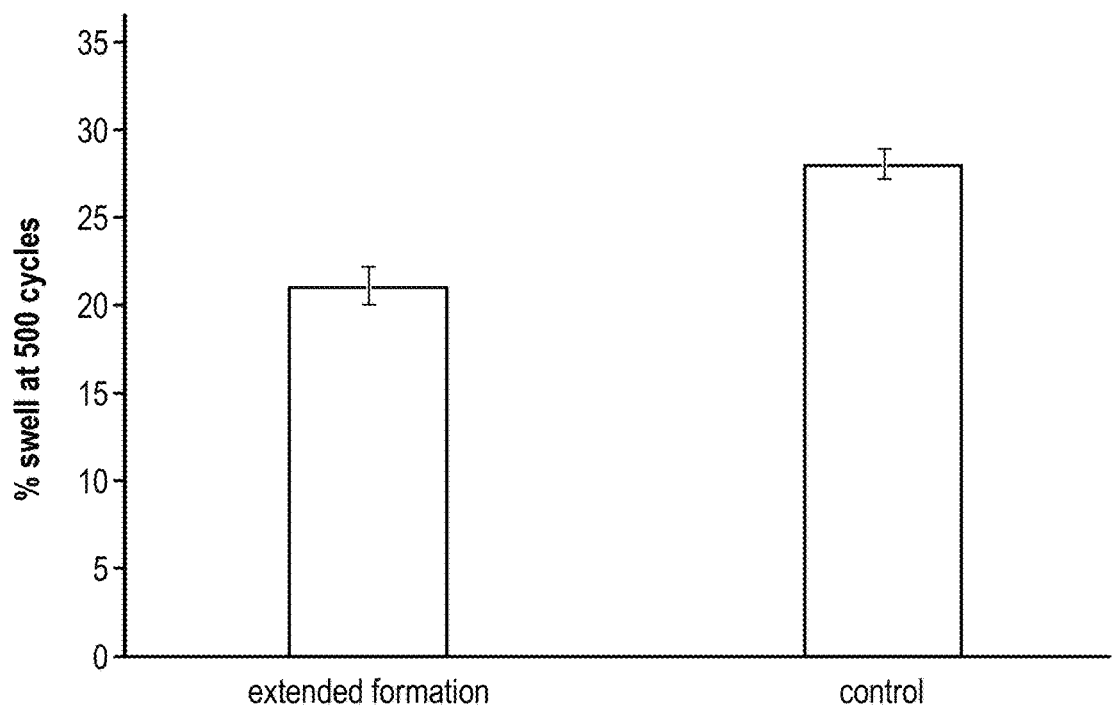
Figure 8B:
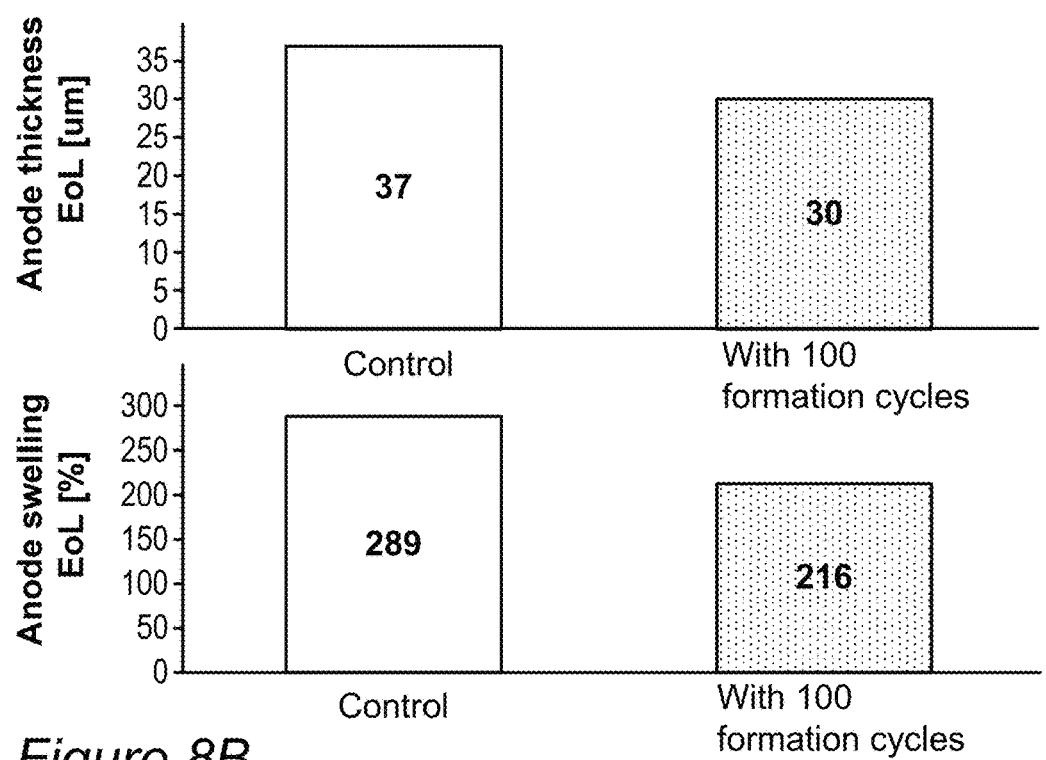

In FIG. 8A, the former (cells with extended formation) have a lower percentage of swelling cells after 500 operation cycles than regular cells. Both types of cells had similar cycling lifetime. FIG. 8B presents a comparison of anode thickness and anode swelling between a cell formed using a regular formation stage and a cell formed using additional 100 fast formation cycles (8C charging, 3C discharging, under mechanical pressure). As illustrated by the results in FIG. 8B, the FIG. 8B anode swelling and the resulting anode thickness are reduced when using the disclosed formation procedure. FIG. 8C illustrates an example for determining the number of additional required formation cycles. In FIG. 8C, the dQ/dV peak disappears at about cycle 120, which may be taken to indicate the number of additional required formation cycles, or be used as a basis for an optimization procedure, taking into account battery performance requirements and implementation practicalities. FIG. 8D illustrates a comparison of anode thickness, averaged over several cells in each case, in cells using NCA and NMC cathodes, with regular formation and with the disclosed addition of 100 formation cycles (8C charging, 3C discharging, under mechanical pressure), right after degassing (end of formation), in the middle of the cell's life (MoL) and at the end of the cell's life (EoL). It is noted that even when no difference is apparent immediately following the degassing stage (end of formation), subsequent anode swelling the thickness are significantly lower during the cell's lifetime when applying the disclosed extended formation stage. In these experiments, the anodes were with Ge-based anode material and electrolyte based on vinylene carbonate (VC) and ethylmethyl carbonate (EMC). It is noted that the number of formation cycles is not counted as part of the cell's cycling lifetime. FIGS. 8E and 8F provide SEM (scanning electron microscope) images of the anodes at their EoL, illustrating that the anode material was less swollen after the applying disclosed formation procedure (100 cycles under pressure) with respect to anode material in a control experiment (FIG. 8E); and partial morphological changes in the anode material in the disclosed procedure (with additional 100 formation cycles under pressure), compared with complete morphological changes in the anode material that was cycled with a regular formation procedure (FIG. 8F). The partial morphological change is indicated by the white dots and flecks in the images of FIG. 8F may be understood as causing or being correlated with the reduced swelling of the anodes.

FIGS. 9A-9C illustrate schematically in a qualitative manner, possible associations between the height and/or prominence of the normalized dQ/dV curve peaks and the resulting cycling lifetime of the cells, according to some embodiments of the invention. The relation between the peak height of the normalized dQ/dV curve and a specified threshold may be related to the cell cycling lifetime, during charging (FIG. 9A) and/or discharging (FIG. 9B) of cell(s) during at least one initial cycle—illustrated schematically as the relation between specified thresholds 1.0, 1.2, 1.4, 1.6 and corresponding cell cycling lifetimes >2000, >1000, 500, 300, respectively. In addition to the height parameter (peak value of the normalized dQ/dV with respect to the specified threshold), in certain embodiments, the specific relation between the shape of the dQ/dV curves, and specifically between the height and/or prominence of normalized dQ/dV peaks 130 and the cycling lifetime of the cells may vary according to the type of cells, anode material and structure, electrolyte composition etc. and may correspond to the details of formation of the SEI. For example, as illustrated in FIG. 9C, the relation may be close to linear in some cases, or enhanced nonlinear in other cases. For a specific type of cells, the dependence is expected to be constant and thereby enable estimation of the cell lifetime through monitoring the peaks in the dQ/dV curves and/or controlling the lifetime by modifying the formation process to yield required peaks in the dQ/dV curves, e.g., fitting specified requirements such as being below a specified threshold.

It is noted that the exact voltage values in which peaks 130 appear are not constant for each cell, but do not change much for each cell and are significantly different for cells with different cycling lifetimes and seem to be related to the cell resistance. Cells that start to charge at low voltages may have an apparent advantage as they reach their capacity below the upper voltage limit, but they also seem to degrade faster. Therefore, in certain embodiments, the cell charging process may be configured to avoid starting at too low voltages, to prevent faster degradation later. For example, if the parasitic reactions in the SEI formation processes, which are related herein to the height and/or prominence of peaks 130, are detected at a voltage range of 3-3.3V, charging can start at a voltage of 3.35 to eliminate the specific parasitic reactions and increase cycle life of the cells. Accordingly, formation processes and/or operation patterns (see below) may be stopped at lower voltage values to avoid reaching peaks 130.

Certain embodiments under further research include the more detailed analysis of dQ/dV behavior during the formation stage and its relation to the dQ/dV behavior during cycling (operation of the cells)—to provide battery management tools that extend battery lifetime; and improved formation processes that yield faster decay of dQ/dV peaks during cycling to increase the cell's cycle life.

In certain embodiments, the expected cell cycling lifetime estimation may be carried out by monitoring at least one charging and/or discharging peak during at least one cycle of the cells which is not necessarily the initial cycle(s), but possibly one or more cycles after the first cycle, or after the formation cycle(s). Corresponding charging/discharging dQ/dV curves and peaks may be used to derive the expected cell cycling lifetime by comparing the at least one monitored peak to a specified threshold. In case there is more than one dQ/dV peak (see, e.g., FIGS. 1, 2A-2C, 3), one or more of them may be used to define the required end of the formation stage, or other parameters of the battery's operation. In certain embodiments, the strongest peak may be used to implement the disclosed invention, and/or peak(s) art specified voltage values or ranges may be used, e.g., dQ/dV peak that occurs at about 3.7-3.8V may be used to implement the disclosed invention. Accordingly, the monitoring may be carried out only during part of the cycling procedure, that corresponds to the location(s) of the dQ/dV peak(s).

FIG. 10 is a high-level flowchart illustrating a method 200, according to some embodiments of the invention. The method stages may be carried out with respect to a system 100 described above, which may optionally be configured to implement method 200. Method 200 may be at least partially implemented by at least one computer processor. Certain embodiments comprise computer program products comprising a computer readable storage medium having computer readable program embodied therewith and configured to carry out the relevant stages of method 200. Method 200 may comprise the following stages, irrespective of their order.

Method 200 may comprise extending a cycling lifetime of a lithium ion battery with metalloid-based anodes (stage 202) by monitoring charging and/or discharging peak(s) during a plurality of cycles of a formation process, the charging and/or discharging peak being defined with respect to corresponding normalized dQ/dV measurements during the cycles, and ending the formation process once the charging and/or discharging peak disappears (stage 215). The cycles of the formation process may be carried out with the battery under pressure, and include degassing the battery upon the ending of the formation process. The disappearance of the charging and/or discharging peak may be defined with respect to an absolute threshold value (e.g., a certain value of the normalized dQ/dV peak value) and/or with respect to a relative value, such as the peak height above its surrounding in the dQ/dV curve (e.g., small peaks below a certain value may be allowed, see, e.g., FIG. 7B). Examples for the former case include, e.g., normalized dQ/dV peak values below any of 1.3, 1.2, 1.1, or 1.0 1/V; examples for the latter case include, e.g., normalized dQ/dV peak height of no more than 10% or 5% of the average dQ/dV value at higher and lower voltage values than the voltage value at which the peak occurs in the cycle. Following initial calibration, the number of required formation cycles may be set at a certain value, that correspond to peak disappearance during the calibration, e.g., any of 30 (see e.g., FIGS. 1, 7A), 60 (see, e.g., FIG. 4B), 80 (see, e.g., FIGS. 3B, 4A, 5), 100 (see, e.g., FIG. 3E) or 120 cycles (see, e.g., FIG. 8C).

Method 200 may comprise estimating, for produced lithium ion cells, an expected cell cycling lifetime (stage 205) by: monitoring charging and/or discharging peak(s) during at least one initial cycle of the cells, the charging and/or discharging peak(s) defined with respect to the corresponding dQ/dV curves during the at least one initial cycle (stage 210), and deriving the expected cell cycling lifetime by comparing the charging and/or discharging peak(s) to a specified threshold (sage 230). For example, the specified threshold may be a normalized peak value of any of 1.0, 1.2, or 1.3 1/V (when normalized with respect to the cell capacity).

In certain embodiments, method 200 may further comprise assuring a quality of the produced lithium ion cells by separating produced lithium ion cells having the expected cell cycling lifetime longer than a specified requirement from the cells with shorter expected cycle life (stage 235). The specified lifetime requirement may be, e.g., 500, 1000 or 1500 hours.

In certain embodiments, method 200 may further comprise configuring a cell formation process to maintain the normalized dQ/dV curve below the specified threshold (stage 240), e.g., with the specified threshold being a peak value of any of 1.0, 1.1, 1.2 or 1.3 1/V during charging, when normalized with respect to a corresponding cell capacity; and/or with the specified threshold being a peak value of 1.0, 1.1, 1.2 or 1.3 1/V during discharging, when normalized with respect to a corresponding cell capacity. For example, the formation processes may be stopped at voltage values which are lower than the values in which the peak values exceed over the specified threshold. In certain embodiments, method 200 further comprises carrying out the cell formation process at a range of voltages that avoids at least one of the peaks (stage 242).

In certain embodiments, method 200 may comprise, at a preparation stage, deriving a number of additional formation cycles (stage 220) by monitoring the charging and/or discharging peak(s) 210, and then configuring the formation stage of a plurality of batteries, e.g., at a production stage, to include the derived number of additional formation cycles (stage 225). In certain embodiments, the additional formation cycles may be fast cycles, carried out at high charging and/or discharging rates (stage 227), e.g., at rates above 1C. The batteries may comprise Li-ion batteries with anode material based on Si, Ge and/or Sn, and the additional formation cycles may be carried out at charging rates above 5C. In certain embodiments, the additional formation cycles may be carried out at charging rates of any of 5C, 8C, 10C, 15C or intermediate, or even higher rates, and at discharging rates of any of 1C, 3C, 5C, 7C or intermediate, or even higher rates.

In certain embodiments, method 200 may further comprise configuring cell operation specifications to maintain the normalized dQ/dV curve below the specified threshold (stage 250), e.g., with the specified threshold being a peak value of any of 1.0, 1.1, 1.2 or 1.3 1/V during charging, when normalized with respect to a corresponding cell capacity; and/or with the specified threshold being a peak value of 1.0, 1.1, 1.2 or 1.3 1/V during discharging, when normalized with respect to a corresponding cell capacity. For example, the operation specifications may be modified to stop charging at voltage values which are lower than the values in which the peak values exceed over the specified threshold. In certain embodiments, method 200 further comprises carrying out the cell operation at a range of voltages that avoids at least one of the peaks (stage 252).

Stages 240, 242, 250 and/or 252 may be part of formation and/or operation processes, described respectively in U.S. patent application Ser. No. 15/867,764, which is incorporated herein by reference in its entirety.

FIG. 11 is a high-level schematic illustration of a system 100, according to some embodiments of the invention. FIG. 11 illustrates schematically one or more controller 105, which may comprise any of a charging system, a battery management system (BMS) or any other module which controls the formation and/or operation of a battery 90 or corresponding cell(s) thereof, e.g., comprising at least one computer processor. In various embodiments, controller(s) 105 may be at least partly integrated with battery 90 or be one or more independent modules, in communication with battery 90. Controller(s) 105 may be configured to control and monitor a formation stage 121 and/or an operation stage 141 of battery(ies) 90, e.g., as disclosed in U.S. patent application Ser. No. 15/867,764, incorporated herein by reference in its entirety. It is noted that disclosed method 200 and system 100 may be integrated in systems and methods disclosed in U.S. patent application Ser. No. 15/867,764, and such configurations are considered part of the current disclosure.

Formation processes 121, which are typically carried out at the battery production factory, may be configured and optimized to increase the cycle life of batteries 90, namely the number of charging and discharging cycles that battery 90 can be used before reaching a predefined deterioration of its performance (e.g., capacity reaching 80% of an original capacity, or a specified value). During formation 121, a charge/discharge system controlled by controller 105 as a charging management module, may be configured to carry out formation cycles comprising multiple charging and discharging steps of battery 90, typically characterized as a first cycle 120A and consecutive cycles 120B. Examples for cycle characteristics which may be determined by controller 105 are the end of charging (C-end) criterion, the extent of charging (maximal capacity or voltage) and discharging (depth of discharge DoD), as well as rates and profiles of charging and discharging. These criteria may be variously defined to optimize the formation process, e.g., by initially measuring lithiation capacities of the anodes and cathodes in half cells and using the measured quantities to define the formation criteria, as well as optionally providing feedback from the formation charging/discharging curve(s) of battery 90 to modify the formation criteria during formation 121 itself, or as a way to derive formation parameters for formation processes 121 of batteries that follow.

Operation processes 141, which are typically carried out by the users of batteries 90, may also be configured and optimized to increase the cycle life of batteries 90, namely the number of charging and discharging cycles that battery 90 can be used before reaching a predefined deterioration of its performance (e.g., capacity reaching 80% of an original capacity, or a specified value). During operation 141, controller 105 such as a battery management system (BMS) which may be at least partly integrated with battery 90 determines charging and/or discharging windows (ranges of voltage, charging and discharging profiles) of battery 90 in the device, depending on its use. The charging and/or discharging windows determine the operation curves of battery 90, which in disclosed embodiments, typically starts with narrow voltage range window cycling 140 and the voltage range window is gradually increased (140A . . . N) as battery 90 deteriorates, up to a maximal voltage range in which the battery is operable (and which is the prior art default operation voltage range). Optionally, feedback may be provided to controller 105 to optimize the modifications of the charging windows. Parameters derived from formation process 121 may be used in controlling the cycles of operation process 141, as disclosed below.

During formation 121 and/or during operation 141, feedback concerning dQ/dV curves 110 and/or maps 120 may be used on optimizing the charging and/or discharging processes in either or both formation 121 and operation 141. For example, the charging and/or discharging profiles may be modified, e.g., charging may be configured to be more gradual, or current ramping may be more or less gradual—to avoid too high normalized dQ/dV rates—in order to extend the battery's cycling lifetime. As illustrated schematically in FIG. 11, non-limiting examples for dQ/dV-related feedback comprise charging/discharging profiles and ranges 131 during formation processes 121 and the configuration of the operation windows and/or ramping up profiles 132 of the current during operation processes 141.

For example, current ramping-up parameters during the constant voltage (CV) phase of charging (e.g., during cell formation, e.g., during first cycle 120A and/or during cell operation) may be adjusted to avoid or reduce dQ/dV during a consecutive constant current (CC) phase of charging, possibly according to data received from a prior charging of the cell or according to data derived from equivalent cells. In certain embodiments, the rate of increasing the voltage in the CC stage (e.g., during cell formation) may be selected to reduce the height of the peaks in the dQ/dV curve.

In various embodiments, the locations and intensities of peaks 130 may be analyzed during the cell's early cycles and/or using representative reference cells, to manipulate the peak patterns to a desired behavior of the cells, having improved cycling lifetime. For example, altered current intensities may be applied at the voltage ranges of peak(s) 130, during cycling and/or formation to modify peaks 130 into peaks 135. Alternatively or complementarily, the voltage range may be changed to exclude voltage ranges corresponding to the peak locations during cycling and/or formation to avoid or reduce the effects of peaks 130. Alternatively or complementarily, CV charging may be applied at voltage ranges of peak(s) 135 during cycling and/or formation. While customary charging begins with CC until the maximum voltage is reaches (following by CV charging at the maximal voltage), certain embodiments comprise modifying charging cycles to incorporate CV charging periods at lower than maximal voltages, e.g., at the voltages of peak 135 (or possibly also peaks 130 and/or 130A) instead or in addition to the maximum voltage—to make the respective peaks less steep and thereby increase the cell lifetime.

Various embodiments comprise implementing any of the disclosed techniques to trigger or eliminate corresponding reactions (related to peaks 130, 130A and/or 135) that take place at the voltage ranges of the corresponding peak(s) to a standard peak height, which characterizes cells with required specified cycle lifetime, and by this to improve their performance. For example, formation and/or operation may be adjusted to maintain any peaks during charging or discharging below the specified level. Peak intensities may be monitored during these manipulations to indicate their efficiency, to transform the peaks into the desired pattern, and to determine a time point when standard cycling procedure can be applied.

Certain embodiments comprise system 100 for controlling an expected cell cycling lifetime of produced lithium ion cells 90. System 100 may comprise at least one controller 105 configured to monitor at least one charging and/or discharging peak during at least one initial or consecutive cycle of cells 90, with the charging and/or discharging peak defined with respect to a corresponding dQ/dV curve during the at least one initial or consecutive cycle. Controller(s) 105 further derives the expected cell cycling lifetime by comparing the at least one monitored peak to a specified threshold. For example, the specified threshold may be a peak value of 1.3 1/V during charging and/or a peak value of 1.0 1/V during discharging, when normalized with respect to a corresponding cell capacity. System 100 may be further configured to assuring a quality of produced lithium ion cells 90 by separating produced lithium ion cells having the expected cell cycling lifetime longer than a specified requirement from the cells with shorter expected cycle life, wherein the specified requirement is any of 500, 1000 and 1500 hours. Controller(s) 105 may be further configured to perform cell formation process 121 while maintaining the normalized dQ/dV curve below the specified threshold and/or to operate 141 the cell while maintaining the normalized dQ/dV curve below the specified threshold (e.g., by stopping the respective process at lower voltage values, before the normalized dQ/dV curve of the respective process reaches the specified threshold).

It is noted that the disclosed embodiments may be implemented in lithium ion batteries to improve their cycle life, charging/discharging rates, safety and/or capacity. The lithium ion batteries typically comprise anodes and cathodes with current collectors affixed thereto, packed with electrolyte and separator(s) in a battery pouch.

Anodes are typically made of anode material particles and additional materials, such as conductive additive(s), binder(s), surfactants, dispersive materials, porosity control materials, etc., and may comprise any of the anode configurations taught, e.g., by U.S. Patent Publication No. 2017/0294687, incorporated herein by reference in its entirety. In certain embodiments, polymerization of coating 105 and/or of coatings of the anode material particles may be controlled, as disclosed, e.g., in any of U.S. Patent Publication No. 2019/0198912 and U.S. Patent Application Nos. 62/711,639 and 62/804,778, incorporated herein by reference in their entirety. For example, anodes may be based on carbon (e.g., graphite, graphene or other carbon-based materials), metalloid anode material such as Si, Ge, Sn and their combinations and/or metals such as Li-metal.

Cathodes may comprise lithium metal oxide (LiMeO), wherein Me can be one or several metals selected from Ni, Co, Fe, Mn and Al or sulfur-based cathodes. For example, cathodes may comprise materials based on layered, spinel and/or olivine frameworks, such as LCO formulations (based on $LiCoO_2$), NMC formulations (based on lithium nickel-manganese-cobalt), NCA formulations (based on lithium nickel cobalt aluminum oxides), LMO formulations (based on $LiMn_2O_4$), LMN formulations (based on lithium manganese-nickel oxides) lithium iron-phosphorus oxide (LFP) formulations (based on $LiFePO_4$), lithium rich cathodes, and/or combinations thereof. Cathodes may further comprise additive (e.g., conductive additives), binders, etc. Separator(s) may comprise various materials, e.g., polymers such as any of polyethylene (PE), polypropylene (PP), polyethylene terephthalate (PET), poly vinylidene fluoride (PVDF), polymer membranes such as a polyolefin, polypropylene, or polyethylene membranes. Multi-membranes made of these materials, micro-porous films and/or spray coating thereof, woven or non-woven fabrics etc. may be used as separator(s), as well as possibly composite materials including, e.g., alumina, zirconia, titania, magnesia, silica and calcium carbonate along with various polymer components as listed above.

Electrolytes may be based on liquid electrolytes, typically linear and cyclic carbonates, such as EC (ethylene carbonate), DC (diethyl carbonate), PC (propylene carbonate), VC (vinylene carbonate), FEC (fluoroethylene carbonate), DEC (diethyl carbonate), EB (ethyl butyrate), BA (butyl acetate), EA (ethyl acetate), EMC (ethyl methyl carbonate), DMC (dimethyl carbonate) and combinations thereof. The electrolyte may comprise any liquid, polymer, gel (e.g., inorganic silica gel electrolytes), glass (e.g., amorphous sulfides-based electrolytes), solid polymer electrolytes (e.g., polyethylene oxide, fluorine-containing polymers and copolymers such as polytetrafluoroethylene), polycrystalline inorganic solid electrolytes and/or combinations thereof. Electrolytes may comprise lithium electrolyte salt(s) such as $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, LiTFSI, $LiB(C_2O_4)_2$, $LiBF_2(C_2O_4)$), tris(trimethylsilyl)phosphite (TMSP), and combinations thereof. Ionic liquid(s) may be added to the electrolyte as taught by WIPO Publication No. WO 2018/109774, incorporated herein by reference in its entirety. For example, electrolytes may comprise a large proportion, e.g., 10%, 20%, 30% or more of VC and/or FEC as prominent cyclic carbonate compound, as disclosed e.g., in U.S. Pat. No. 10,199,677, incorporated herein by reference in its entirety. In certain embodiments, electrolytes may comprise linear solvent comprising at least one three-carbon and/or four-carbon chain ester, cyclic carbonate solvent and at least one lithium salt, as disclosed e.g., in U.S. Patent Publication No. 2019/0148774, incorporated herein by reference in its entirety.

Disclosed lithium ion batteries (and/or respective battery cells thereof) may at least partly be configured, e.g., by selection of materials, to enable operation at high charging and/or discharging rates (C-rate), ranging from 3-10C-rate, 10-100C-rate or even above 100C, e.g., 5C, 10C, 15C, 30C or more. It is noted that the term C-rate is a measure of charging and/or discharging of cell/battery capacity, e.g., with 1C denoting charging and/or discharging the cell in an hour, and XC (e.g., 5C, 10C, 50C etc.) denoting charging and/or discharging the cell in 1/X of an hour—with respect to a given capacity of the cell.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram or portions thereof.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

We claim:

1. A battery formation method comprising:
    at a preparation stage, deriving a number of additional formation cycles by monitoring at least one charging and/or discharging peak during a plurality of formation cycles of a battery formation stage, the charging and/or discharging peak being defined with respect to corresponding dQ/dV measurements during the cycles,
    configuring a formation stage of a plurality of batteries to include the derived number of additional formation cycles;
    deriving the expected cell cycling lifetime by comparing the at least one monitored peak to a specified threshold, wherein at least one of the monitoring and the deriving is carried out by at least one computer processor; and
    identifying lithium ion cells having the expected cell cycling lifetime longer than a specified requirement from the cells with shorter expected cycle lifetime.

2. The battery formation method of claim 1, wherein the additional formation cycles are carried out at rates above 1C.

3. The battery formation method of claim 1, wherein the batteries are Li-ion batteries with anode material based on Si, Ge and/or Sn, and the additional formation cycles are carried out at charging rates above 5C.

4. The method of claim 1, wherein the disappearance of the charging and/or discharging peak is defined as the respective peak being less than 10% above its surrounding.

5. The method of claim 1, wherein the disappearance of the charging and/or discharging peak is defined as the respective peak being less than 1.3 1/V.

6. The method of claim 5, wherein the disappearance of the charging and/or discharging peak is defined as the respective peak being less than 1.0 1/V.

7. A method comprising:
    monitoring at least one charging and/or discharging peak during a plurality of cycles of a formation process, the charging and/or discharging peak being defined with respect to corresponding dQ/dV measurements during the cycles,
    ending the formation process once the charging and/or discharging peak disappears;
    deriving the expected cell cycling lifetime by comparing the at least one monitored peak to a specified threshold, wherein at least one of the monitoring and the deriving is carried out by at least one computer processor; and
    identifying lithium ion cells having the expected cell cycling lifetime longer than a specified requirement from the cells with shorter expected cycle lifetime.

8. The method of claim 7, configured to extend a cycling lifetime of a lithium ion battery with anodes having anode material that is based on Si, Ge and/or Sn.

9. The method of claim 7, further comprising configuring a formation stage of a lithium ion battery to maintain the charging and/or discharging peak below a specified threshold.

10. The method of claim 9, further comprising carrying out the battery formation stage at a range of voltages that avoids the at least one charging and/or discharging peak.

11. The method of claim 7, wherein the cycles of the formation process are carried out with the battery under pressure, and degassing the battery upon the ending of the formation process.

12. The method of claim 7, wherein the disappearance of the charging and/or discharging peak is defined as the respective peak being less than 10% above its surrounding.

13. The method of claim 7, wherein the disappearance of the charging and/or discharging peak is defined as the respective peak being less than 1.3 1/V.

14. The method of claim 13, wherein the disappearance of the charging and/or discharging peak is defined as the respective peak being less than 1.0 1/V.

15. The method of claim 7, wherein the plurality of cycles comprises at least 100 cycles.

16. A method of estimating an expected cell cycling lifetime of a lithium-ion cell, comprising:
    monitoring at least one charging and/or discharging peak during at least one initial cycle of the cell, the charging and/or discharging peak being defined with respect to a corresponding dQ/dV curve obtained during the at least one initial cycle,
    deriving the expected cell cycling lifetime by comparing the at least one monitored peak to a specified threshold, wherein at least one of the monitoring and the deriving is carried out by at least one computer processor; and
    identifying lithium ion cells having the expected cell cycling lifetime longer than a specified requirement from the cells with shorter expected cycle lifetime.

17. The method of claim 16, wherein the specified threshold is a normalized peak value of 1.3 1/V during charging, with the peak value normalized with respect to a corresponding cell capacity.

18. The method of claim 16, wherein the specified threshold is a normalized peak value of 1.0 1/V during discharging, with the peak value normalized with respect to a corresponding cell capacity.

19. The method of claim 16, further comprising separating the lithium ion cells having the expected cell cycling lifetime longer than the specified requirement from the cells with the shorter expected cycle life.

20. The method of claim 16, wherein the specified requirement is 500 hours.

21. The method of claim 16, wherein the specified requirement is 1000 hours.

22. The method of claim 16, wherein the specified requirement is 1500 hours.

23. A non-transitory computer program product for estimating an expected cell cycling lifetime of a lithium-ion cell, the computer program product stores instructions for:

monitoring at least one charging and/or discharging peak during at least one initial cycle of the cell, the charging and/or discharging peak being defined with respect to a corresponding dQ/dV curve obtained during the at least one initial cycle, deriving the expected cell cycling lifetime by comparing the at least one monitored peak to a specified threshold, wherein at least one of the monitoring and the deriving is carried out by at least one computer processor; and identifying lithium ion cells having the expected cell cycling lifetime longer than a specified requirement from the cells with shorter expected cycle lifetime.

24. The non-transitory computer program product according to claim 23 that stores instructions for ending the formation process once the charging and/or discharging peak disappears.

25. The non-transitory computer program product according to claim 23 that stores instructions for configuring a formation stage of a plurality of batteries to include the derived number of additional formation cycles.

* * * * *